(12) United States Patent
Davis

(10) Patent No.: US 9,330,426 B2
(45) Date of Patent: May 3, 2016

(54) DIGITAL VIDEO FINGERPRINTING

(75) Inventor: Andrew Gordon Davis, Woodbridge (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 169 days.

(21) Appl. No.: 13/877,267

(22) PCT Filed: Sep. 30, 2011

(86) PCT No.: PCT/GB2011/001430
§ 371 (c)(1),
(2), (4) Date: Apr. 1, 2013

(87) PCT Pub. No.: WO2012/042225
PCT Pub. Date: Apr. 5, 2012

(65) Prior Publication Data
US 2013/0208942 A1  Aug. 15, 2013

(30) Foreign Application Priority Data

Sep. 30, 2010 (EP) ..................................... 10251704

(51) Int. Cl.
*G06F 21/10* (2013.01)
*G06F 21/64* (2013.01)
(Continued)

(52) U.S. Cl.
CPC ........ *G06T 1/0021* (2013.01); *G06F 17/30784* (2013.01); *G06F 21/10* (2013.01);
(Continued)

(58) Field of Classification Search
CPC ... G06F 21/10; G06F 21/64; G06F 17/30784; G06F 2221/0733; G06K 9/00744; H04N 19/14; H04N 19/172; H04N 19/176; H04N 19/177; H04N 19/18; H04N 19/48; G06T 1/0021
See application file for complete search history.

(56) References Cited

U.S. PATENT DOCUMENTS 6,912,294 B2 * 6/2005 Wang et al. .................... 382/100
7,487,356 B2 * 2/2009 Kunisa .......................... 713/176

(Continued)

FOREIGN PATENT DOCUMENTS

| CN | 101404750 | 4/2009 |
|---|---|---|
| WO | 01/63937 | 8/2001 |

(Continued)

OTHER PUBLICATIONS

Bavipati et al., "Secure Compressed Domain Watermarking for H.264 Video", Information Technology: New Generations (ITNG), 2010 Seventh International Conference on, 387-391.*

(Continued)

*Primary Examiner* — Katrina Fujita
(74) *Attorney, Agent, or Firm* — Nixon & Vanderhye PC

(57) ABSTRACT

A digitally encoded video fingerprinting system for generating and comparing/matching finger-prints from digitally encoded video which has been encoded according to an encoding method which involves the generation of residual macroblocks of pixels and the generation of quantized transform coefficients of the residual macroblocks, or of portions of the residual macroblocks, comprises a fingerprint database (5) and a video processing subsystem (10). The video processing subsystem (10) includes a fingerprint sequence selection module (14, 24) which is operable to select one or more sets of frames from input video content to be processed in order to generate a fingerprint; a fingerprint calculation module (14, 26) which is operable to generate a fingerprint based on a set of frames selected by the fingerprint sequence selection module; and a fingerprint comparator module (14, 28) which is operable to compare two fingerprints and to output a similarity score of the compared fingerprints. The method used by the fingerprint selection and fingerprint calculation modules includes selecting a group of frames of the encoded video content; processing the digitally encoded video content to obtain a set of quantized transform coefficients of residual macroblocks or portions of residual macroblocks associated with each of the selected frames; identifying a set of residual macroblocks per frame whose transform coefficients satisfy a threshold criterion; and generating a digital video fingerprint for the encoded video content in dependence upon the identified macroblocks or some property thereof within each of the selected frames.

19 Claims, 15 Drawing Sheets

(51) Int. Cl.

| | | |
|---|---|---|
| *G06F 17/30* | (2006.01) | |
| *G06K 9/00* | (2006.01) | |
| *H04N 19/176* | (2014.01) | |
| *H04N 19/14* | (2014.01) | |
| *H04N 19/18* | (2014.01) | |
| *H04N 19/48* | (2014.01) | |
| *G06T 1/00* | (2006.01) | |
| *H04N 19/172* | (2014.01) | |
| *H04N 19/61* | (2014.01) | |
| *H04N 19/177* | (2014.01) | |

(52) U.S. Cl.
CPC ........... *G06F 21/64* (2013.01); *G06K 9/00744* (2013.01); *H04N 19/14* (2014.11); *H04N 19/172* (2014.11); *H04N 19/176* (2014.11); *H04N 19/177* (2014.11); *H04N 19/18* (2014.11); *H04N 19/48* (2014.11); *H04N 19/61* (2014.11); *G06F 2221/0733* (2013.01)

(56) References Cited

U.S. PATENT DOCUMENTS

| | | | |
|---|---|---|---|
| 2002/0028021 A1 | 3/2002 | Foote et al. | |
| 2003/0090505 A1 | 5/2003 | McGee et al. | |
| 2004/0028281 A1 | 2/2004 | Cheng et al. | |
| 2006/0107056 A1 | 5/2006 | Bhatt et al. | |
| 2006/0187358 A1 | 8/2006 | Lienhart et al. | |
| 2006/0257000 A1* | 11/2006 | Boyce et al. | 382/100 |
| 2006/0280246 A1 | 12/2006 | Alattar et al. | |
| 2008/0310731 A1 | 12/2008 | Stojancic et al. | |
| 2008/0313140 A1 | 12/2008 | Pereira et al. | |
| 2009/0030651 A1 | 1/2009 | Wold | |
| 2009/0141805 A1 | 6/2009 | Lu et al. | |
| 2009/0263014 A1 | 10/2009 | Zhang et al. | |

FOREIGN PATENT DOCUMENTS

| | | |
|---|---|---|
| WO | 2008/065340 | 6/2008 |
| WO | 2009/076823 | 6/2009 |

OTHER PUBLICATIONS

N. Ramaswamy et al., "Video Authentication for H.264/AVC Using Digital Signature Standard and Secure Hash Algorithm", Proceedings of the 16th Annual International Workshop on Network and Operating Systems Support for Digital Audio, Nossdav 2006, May 22, 2006, May 23, 2006, pp. 1-6.
S. Shahabuddin et al., "Compressed-Domain Temporal Adaptation-Resilient Watermarking for H.264 Video Authentication", Multimedia and Expo, 2009, IEEE International Conference, Jun. 28, 2009, pp. 1752-1755.
K. Ait Saadi et al., "Combined Fragile Watermark and Digital Signature for H.264/AVC Video Authentication", Proceedings of the 2009 European Signal Processing Conference (EUSIPCO—2009), Aug. 24, 2009, Aug. 28, 2009, pp. 1799-1803.
S. Lee et al., "Robust Video Fingerprinting Based on Symmetric Pairwise Boosting", IEEE Transactions on Circuits and Systems for Video Technology, vol. 19, No. 9, Sep. 1, 2009, pp. 1379-1388.
H. Wang et al., "Survey of Compressed-Domain Features Used in Audio-Visual Indexing and Analysis", Journal of Visual Communication and Image Representation, vol. 14, No. 2, Jun. 1, 2003, all pages.
C. Nafornita et al., "Image Watermarking Based on the Discrete Wavelet Transform Statistical Characteristics", Computer as a Tool, 2005, Eurocon 2005, The International Conference on Belgrade, vol. 21, Nov. 2005, pp. 943-946.
C. Podilchuk et al., "Image-Adaptive Watermarking using Visual Models", IEEE Journal on Selected Areas in Communications, vol. 16, No. 4, May 1, 1998.
European Search Report (9 pgs.) dated Feb. 4, 2011 issued in corresponding European Application No. 10 25 1704.
Podilchuk, Christine I., "Image-Adaptive Watermarking Using Visual Models", IEEE Journal on Selected Areas in Communications, vol. 16, No. 4, May 1998 (16 pgs.).
Nafornita, Corina, "Image Watermarking Based on the Discrete Wavelet Transform Statistical Characteristics", EUROCON 2005, Serbia & Montenegro, Belgrade, Nov. 22-24, 2005 (4 pgs.).
Saadi, K. Ait et al., "Combined Fragile Watermark and digital Signature for H.264/AVC Video Authentication".
Lee, Sunil et al., "Robust Video Fingerprinting Based on Symmetric Pairwise Boosting", IEEE Transactions on Circuits and Systems for Video Technology, vol. 19, No. 9, Sep. 2009 (10 pgs.).
Wang, Hualu et al., "Survey of compressed-domain features used in audio-visual indexing and analysis", XP-002526966, J. Vis. Commun. Image R. 14 (2003) 150-183 (34 pgs.).
Nandakishore Ramaswamy and K. R. Rao, "Video Authenitcation for H.264/AVC using Digital Signature Standard and Secure Hash Algorithm", Qualcomm Inc., San Diego, CA and The University of Texas at Arlington, Arlington, TX, NOSSDAV '06, May 22-23, 2006, Newport, Rhode Island (6 pgs.).
Shahabuddin, Sharmeen et al., "Compressed-Domain Temporal Adaptation-Resilient Watermarking for H.264 Video Authentication", Distributed Collaborative Virtual Environments Research Laboratory (DISCOVER Lab), Multimedia Communications Research Laboratory (MCR Lab), School of Information Technology and Engineering, University of Ottawa, Ottawa, Canada, 2009 IEEE (4 pgs.).
Senechal, Benjamin et al., "Audio, Video and Audio-Visual Signatures for Short Video Clip Detection: Experiments on Trecvid2003", LIS, Grenoble Cedex, France, CLIPS-IMAG, Grenoble Cedex, France and LIRIS, Villeurbanne Cedex, France, 2005 IEEE (4 pgs.).
Jia, Ke-Bin et al., "The Research of Video Matching Algorithm Based on Spatio-Temporal Features", College of Electronic Information & Control Engineering, Beijing University of Technology, Beijing, China, (date unknown) (4 pgs.).
Seungjae Lee and Young Ho Suh, "Video Fingerprinting Based on Orientation of Luminance Centroid", Digital Contents Research Division, ETRI, Daejeon, Korea, 2009 IEEE (4 pgs.).
Chen, Xiuxin et al., "A Video Retrieval Algorithm Based on Spatio-temporal Feature Curves", College of Electronic Information & Control Engineering, Beijing University of Technology, Beijing, China and College of Information Engineering, Beijing Technology and Business University, Beijing, China, 2008 IEEE (4 pgs.).
Kashino, Kunio et al., "A quick video search method based on local and global feature clustering", NTT Communication Science Laboratories, Atsugi, Japan, Proceedings of the 17th International Conference on Pattern Recognition (ICPR '04) IEEE, (4 pgs.).
Kashino, Kunio et al., "A Quick Search Method for Audio and Video Signals Based on Histogram Pruning", IEEE Transactions on Multimedia, vol. 5, No. 3, Sep. 2003 (10 pgs.).
Zheng, Aihua et al., "Temporal Pattern Recognition in Video Clips Detection", Anhui University, People's Republic of China and The University of Greenwich, United Kingdom, 2009 Eighth IEEE/ACIS International Conference on Computer and Information Science, (6 pgs.).
Xu, Xing et al., "Robust Video Fingerprinting Based on Visual Attention Regions", Graduate School, Chinese Academy of Sciences, Beijing, China and Institute of Digital Media, Key Laboratory of Machine Perception, Beijing, China, 2009 IEEE, ICASSP 2009 (4 pgs.).
Ina Dohring and Rainer Lienhart, "Fast and Effective Features for Recognizing Recurring Video Clips in Very Large Databases" Lehrstuhl fur Multimedia Computing, Universitat Augsburg, 14th International Conference of Image Analysis and Processing—Workshops (ICIAPW 2007), 2007 IEEE (6 pgs.).
Soo-Chang Pei and Yu-Zuong Chou, "Efficient MPEG Compressed Video Analysis Using Macroblock Type Information" IEEE Transactions on Multimedia, vol. 1, No. 4, Dec. 1999 (13 pgs.).
Wang, Roy et al., "A confidence measure based moving object extraction system built for compressed doman", Beckman Institute, University of Illinois at Urbana Champaign, Urbana, IL and Microsoft Research, Beijing, China, ISCAS 2000—IEEE International Symposium on Circuits and Systems, May 28-31, 2000, Geneva, Switzerland (4 pgs.).

(56) References Cited

OTHER PUBLICATIONS

Hsieh, Chen-Chiung et al., "A Real Time Spatial/Temporal/Motion Integrated Surveillance System in Compressed Domain", Department of Computer Science and Engineering, Tatung University, Taipei, Taiwan, Department of Communications Engineering, Yuan Ze University, Taoyuan, Taiwan and Hgiga Inc., HsinChu, Taiwan, Eighth International Conference on Intelligent Systems Design and Applications, 2008 IEEE (8 pgs.).

Gruhne, Matthias et al., "Cross-modal identification of audiovisual streams directly from the compressed domain", Fraunhofer IDMT, Metadata Departement, Ilmenau, Germany, Elevard Devices, Tomsk, Russia and ICCS, University of Athens, Athens, Greece, The $13^{th}$ IEEE International Symposium on Consumer Electronics (ISCE2009), 2009 IEEE (4 pgs.).

Porikli, Fatih et al., "Compressed Domain Video Object Segmentation", IEEE Transactions on Circuits and Systems for Video Technology, vol. 20, No. 1, Jan. 2010 (13 pgs.).

\* cited by examiner

Figure 11
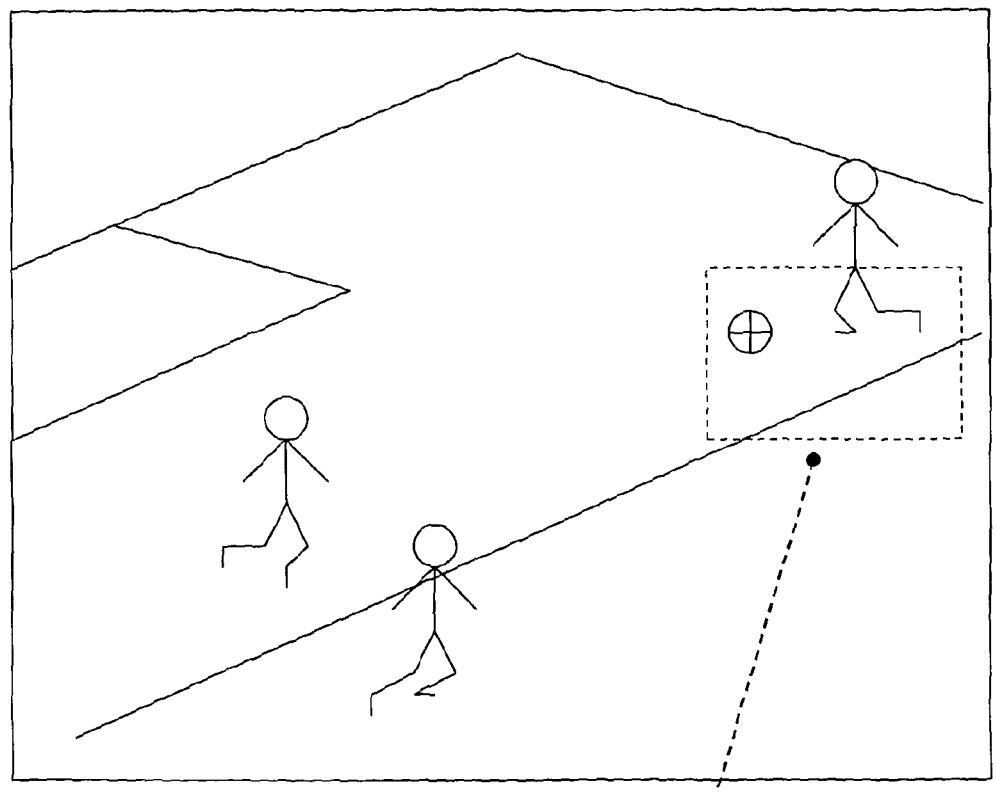
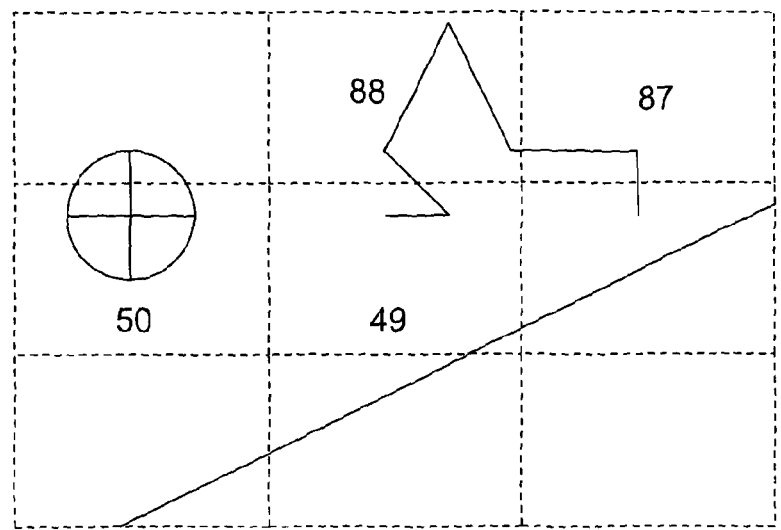

DIGITAL VIDEO FINGERPRINTING

This application is the U.S. national phase of International Application No. PCT/GB2011/001430 filed 30 Sep. 2011 which designated the U.S. and claims priority to EP 10251704.2 filed 30 Sep. 2010, the entire contents of each of which are hereby incorporated by reference.

TECHNICAL FIELD

The present invention relates to digital video fingerprinting, and, in particular, to a method and apparatus for generating a fingerprint from a digital representation of a piece of video content.

BACKGROUND

The extensive use of video content on the Internet has led to a need for a system that allows statistics on the use and distribution of video material to be gathered from computers and computer networks, etc. A key function of such a system is the reliable and efficient identification of video content which might involve the separate or combined use of metadata, digital watermarking and digital fingerprinting.

Metadata can be added to digital files of video content in order to be able to easily identify the video content (as well as for other reasons). However, this metadata can be easily removed by (malicious) parties who do not wish the video content to be easily identified.

Digital watermarking of video content is the process of embedding auxiliary information into a digital representation of the video content, which can later be used to identify the content. Ideally, such watermarking of video content should be imperceptible to a viewer and robust to any editing or transcoding that the video might undergo (as well as being difficult for a user to simply remove the watermark). The design of robust and imperceptible digital watermarking techniques is challenging and has attracted much research effort. The metadata and watermarking approaches have a number of drawbacks. There is the need for insertion of a watermark or metadata in all possible versions of the signal. Then, even if every media file were to originally include such identification data, the techniques are vulnerable to tampering and files could be "unlocked". Once unlocked, metadata and watermarking techniques cannot be used to re-identify data, so that content could be distributed and used without risk of detection.

Digital fingerprinting refers to a method of identifying and matching digital files based on digital properties of those files. Representing a large data item, such as piece of digital video content, by a relatively small digital fingerprint allows for the efficient identification of copies. The fingerprinting process first requires the analysis of digital video content of interest to build an indexed database of digital fingerprints. A query signal may then be analysed by the extraction of a query fingerprint (from the query signal) and the comparison of that fingerprint with the database of known digital fingerprints. Digital fingerprinting may be performed on properties of the raw data file, but such techniques are not robust to the effects of processes such as transcoding, resampling and re-editing.

However, more robust performance may be achieved by basing the digital fingerprints on properties of the underlying video, such as trends in luminance, color, pixel positioning and visual attention.

Digital fingerprinting on properties of the video content has the advantage over metadata and watermarking that no auxiliary data needs to be added to the digital files. These files cannot then be "unlocked" without significantly changing properties of the underlying video content. Even then, such changes might be rendered ineffective by suitably upgraded fingerprint profiles. Such "future proofing" is a significant advantage of the use of digital fingerprinting for video content identification.

Digital fingerprinting techniques should be reliable, robust and efficient. Reliable means that the process used to generate and compare fingerprints should be such that a fingerprint extracted from an unknown signal is reliably associated with the correct indexed fingerprint if it is present in the indexed database of digital fingerprints. Robust means that reliability should not be seriously affected by transcoding, re-sampling, re-editing, etc of the video signal. Finally, efficient means that the computational complexity of both the calculation of the query fingerprint and of performing the database comparison must be kept to practical limits (in addition the size of the database should be kept to a practical size, although, since the size of the database is likely to affect the complexity of performing a comparison, this may be a corollary of the database comparison constraint). Most research to date of which the Applicant is aware has focused on reliability and robustness aspects of digital fingerprinting, with analysis performed in the pixel domain. Such analysis requires the decoding of the video content, which, most especially for the latest compression techniques such as H.264, has significant processing implications. The complexity of decoding the video content can restrict the practical application of pixel-based fingerprinting for video identification, particularly where storage and processing limitations apply.

US 2006/0187358 describes a digital video content fingerprinting system which has improved efficiency compared to systems in which analysis is performed in the pixel domain. In this system only a very crude decoding is performed to obtain "DC images" (which approximately comprise frames of macroblock resolution only where the luminosity assigned to each macroblock corresponds approximately to the average luminosity of the "actual" pixels within that macro block (by "actual" it is meant the pixels that would result from doing a full and proper decoding of the compressed video content)). Although the DC image frames which result from this crude decoding are indeed very crude, it is sufficient to obtain a useful fingerprint and the amount of processing required to perform the crude decoding is much less than would be required to perform a full decoding to get to the pixel level.

Ramaswamy and Rao "Video authentication for H.264/AVC using digital signature standard and secure hash algorithm", proceedings of the 16th Annual International workshop on network and operating systems support for digital audio and video, Nossdav 2006, XP002620466 describes a method of generating a digital signature for a piece of digital video which is computationally efficient, will detect even small tampering to the video and including various spatial and temporal manipulations of the video and can also point out the reason for an authentication failure if the video has been tampered with (including the group of pictures within which the tampering has been detected). It operates by taking certain coefficients (e.g. the DC coefficient and the first two AC coefficients) of every coded macroblock in every frame—i.e. without selecting a set of identified macroblocks satisfying a threshold criterion (with some macroblocks failing the threshold criterion and thus not being selected). In this way, any tampering of the video should be detected.

Shahabuddin et al "Compressed-domain temporal adaptation-resilient watermarking for H.264 video authentication" Multimedia and Expo, 2009—ICME 2009—IEEE Int. Conference on, IEEE, Piscataway, N.J., USA 28 Jun. 2009 pages 17-52-1755, XP031511116 describes a watermarking system in which a robust watermark is inserted into a digitally encoded piece of video so that the video can later be identified by recovering the watermark form the watermarked piece of digitally encoded content.

Saadi et al "Combined fragile watermark and digital signature for H.264/AVC video authentication" Proceedings of the 2009 European Signal Processing Conference (EU-SIPCO-2009) pages 1799-1803XP002620467 describes a method of generating a digital signature and then inserting it into the video as a fragile watermark. The method of generating the digital signature is the same as in the Ramaswamy and Rao paper identified above.

SUMMARY OF THE INVENTION

According to a first aspect of the present invention, there is provided a method of generating a digital video fingerprint from a piece of digitally encoded video content, the video content having been encoded according to an encoding method which involves the generation of residual macroblocks of pixels and the generation of quantized transform coefficients of the residual macroblocks or of portions of the residual macroblocks, the method comprising: selecting a group of frames of the encoded video content; processing the digitally encoded video content to obtain a set of quantized transform coefficients of residual macroblocks or portions of residual macroblocks associated with each of the selected frames; identifying a set of residual macroblocks per frame whose transform coefficients satisfy a threshold criterion; and generating a digital video fingerprint for the encoded video content in dependence upon the identified macroblocks or some property thereof (e.g. their locations) within each of the selected frames.

Preferably, the threshold criterion is associated with the magnitude of the quantized transform coefficients (e.g. Direct Cosine Transform (DCT) coefficients) of macroblocks or parts of macroblocks by forming a test value which depends upon the magnitude of the quantized transform coefficients whereby macroblocks having high quantized transform coefficients (and consequently high test values) are more likely to satisfy the threshold criterion (i.e. the threshold value needs to be exceeded by the test value, rather than the test value being below the threshold value). The test value could be formed from the average quantized transform coefficient value associated with a particular macro block or from the maximum coefficient value associated with the macro block or it could be a value which depends upon both the average and the maximum etc. The test value could then be compared with either a static threshold value (which could apply (i.e. be equal) across a single frame or a group of frames or it could be a universal static value across all video sequences to be fingerprinted). Alternatively a relative threshold could be used such that the macroblocks whose test values fall within a certain upper percentile of the total set of test values generated for each macroblock being considered (again possibly associated with just a single frame or a single group of frames or of all frames being considered for use in forming a single fingerprint) (e.g. the macroblocks whose test values fall within the top tenth percentile of such values) could be identified. Alternatively some sort of hybrid approach could be adopted wherein the top (e.g. tenth) percentile (of macroblocks within a given frame or group of frames, etc.) is chosen so long as their test value exceeds some predefined minimum absolute or relative test value (relative to say a group of frames), or alternatively the top say 5% of macroblocks is selected per frame and then additionally, of the macroblocks which have not already been selected as part of the top 5% of any given frame, those macroblocks having the highest test values are additionally selected perhaps until some desired total number of macroblocks has been selected or until the test value falls below a specified absolute threshold value, etc.

Thus the step of identifying a set of residual macroblocks per frame whose transform coefficients satisfy a threshold criterion preferably includes the (sub-)steps of generating a test value for each macroblock which depends upon the magnitudes of the quantized transform coefficients associated with that macroblock and comparing the test value against a threshold value and identifying the macroblock as satisfying the threshold criterion if the test value exceeds the threshold value. Note that even where the threshold test involves identifying the top xth percentile, this can be equated to (i.e. it may be considered mathematically equivalent to) identifying the threshold value which would result in the top xth percentile macroblocks being selected and then comparing each test value with that threshold value—in other words, the wording "comparing the test value against a threshold value" is intended to cover algorithms for identifying the top xth percentile of test values within a group of values even if the algorithm employed to achieve this works without making such a comparison directly (e.g. it just iteratively identifies the macroblocks with the highest test values until it has identified the top xth percentile of such values, etc.). The wording is also intended to apply to other processes which can be mathematically equated to identifying a test value and comparing it with a threshold value even if additional processes are also involved—e.g. if a combination of different approaches is used as discussed above. Also note that the test value may in some cases by a vector of values rather than a single value. In such a case comparison of the test vector of values with a threshold value (which might also therefore be a vector of values) might involve identifying test vectors which are not dominated by the threshold vector, etc.

Preferably, the step of selecting a group of frames of the encoded video content includes identifying a group of frames such that a digital video fingerprint generated therefrom has high levels of robustness and reliability. Preferably this is performed by generating fingerprints from a plurality of different groups of frames of the encoded video and then ascertaining the degree of match found between each of this plurality of different groups of frames with a respective fingerprint generated from a corresponding group of frames taken from an encoding of the same video content using a different encoding method (e.g. at a different encoding rate and/or quality level associated, for example, with a different quantization parameter). Alternatively an automatic classifier such as a neural network could be trained using for example test data in which the above mentioned method has been used to identify the best group of frames to use and then used to try to identify optimum groups of frames to use based only on information available from a single encoding of the video content to be fingerprinted, etc.

Note that this method is clearly distinguished from US 2006/0187358 at least because in US 2006/0187358 there is no teaching of using the residual macroblocks for doing thresholding, etc. Use of residual macroblocks is advantageous for two reasons: firstly a large part of the processing required to perform decoding is associated with converting residual macroblocks to non-residual macroblocks; and secondly, whatever encoding process is used, it is likely that the same (hard to predict) macroblocks will yield high valued residual macroblocks and so the method is robust to different types of encoding processes being used (e.g. if a piece of football content (e.g. Football Video 001) is encoded with a first encoding process (e.g. an Open Source H.264 encoder such as FFmpg) and a reference digital fingerprint is taken from this and then the same video content (Football Video 001) is encoded using say a proprietary H.264 encoder (e.g. the Microsoft Media Foundation H.264 video encoder) and is used to obtain a query fingerprint, then there should be no difficulty in the fingerprints being successfully matched to one another). Similarly, the fingerprinting may even be robust to encoding mechanisms based on alternative encoding standards such as H.263 and H.261. In general, so long as the same macroblocks are processed by the encoder and so long as some sort of residual macroblocks are generated by the encoder, there is a good chance that a match will be made between a target and source video encoding of a certain piece of video.

The present invention thus permits digital fingerprinting to be carried out in the DCT domain (i.e. without having to decode the video fully into the pixel domain). Parsing of the encoded video data needs to be performed to identify transform coefficients associated with residual macroblocks, but the more complex decoding of the video pixels is avoided. It should be noted that the present invention positively desires to use residual macroblocks (i.e. macroblocks corresponding to the difference between an actual macroblock to be encoded and a reference macroblock available to both the encoder and the decoder). However, not all macroblocks will be residual macroblocks. For example, within an I-frame no other frames are referenced. This means that only intra frame prediction may be used and thus many macroblocks will be non-residual macroblocks (or at least because only prediction of MBs from other MBs already encoded within that frame is permitted, the efficiency of prediction is typically lower, leading to higher residual energy). It may therefore be advantageous to avoid using I-frames in the sequence of frames selected for generating a fingerprint, or simply to ignore any such frames appearing in the selected sequence. However, provided the number of non-residual macroblocks in the selected sequence is small relative to the number of residual macroblocks in that sequence, the effect of having (some) non-residual macroblocks in the selected sequence may be sufficiently small that they can simply be included in the derived fingerprint. i.e. the fingerprint generator may treat residual and non-residual macroblocks in the same way.

Preferably, the fingerprint comprises a number of sets of macroblocks (or macroblock identities) for which different threshold criteria are satisfied. For example it could comprise a set of macroblocks whose transform coefficients indicate a high level of horizontal spatial energy together with a set of macroblocks (or macroblock identities) whose transform coefficients indicate a high level of vertical spatial energy, or some other combination. Preferably the transform coefficients may be divided into different groups and the fingerprint may comprise a set of macroblocks (or macroblock identities) having respective groups of transform coefficients satisfy threshold criteria.

According to a second aspect of the present invention, there is provided a method of identifying a digitally encoded and compressed piece of unknown video content, the method comprising: generating a database of fingerprints from a plurality of known pieces of video content using a method in accordance with the first aspect of the present invention; generating a fingerprint from the unknown video content using a method in accordance with the first aspect of the present invention and comparing the fingerprint generated from the unknown video content with each of the fingerprints in the database; and identifying the unknown piece of video content as being likely to be the known video content whose fingerprint within the database of fingerprints satisfies a similarity criterion when compared with the fingerprint generated from the unknown video content.

It may be desirable to supplement the method of the second aspect of the present invention with additional confirmation methods. For example, a pixel domain based automatic comparison method could be used to provide a greater degree of confirmation that the identification performed by the method of the second aspect of the present invention is accurate, or a manual method could be employed whereby a human user views the unknown video content and compares it with the known video content which has been identified as a match by the method of the second aspect of the present invention.

According to a third aspect of the present invention, there is provided apparatus for generating a digital video fingerprint from a piece of digitally encoded video content, the video content having been encoded according to an encoding method which involves the generation of residual macroblocks of pixels and the generation of quantized transform coefficients of the residual macroblocks or of portions of the residual macroblocks, the apparatus comprising: selection means for selecting a group of frames of the encoded video content; processing means for processing the digitally encoded video content to obtain a set of quantized transform coefficients of residual macroblocks or portions of residual macroblocks associated with each of the selected frames; identification means for identifying a set of residual macroblocks per frame whose transform coefficients satisfy a threshold criterion; and generation means for generating a digital video fingerprint for the encoded video content in dependence upon the identified macroblocks or some property thereof (e.g. their locations) within each of the selected frames.

According to a fourth aspect of the present invention, there is provided apparatus for generating a digital video fingerprint from a piece of digitally encoded video content, the video content having been encoded according to an encoding method which involves the generation of residual macroblocks of pixels and the generation of quantized transform coefficients of the residual macroblocks or of portions of the residual macroblocks, the apparatus comprising a digital processor unit programmed to: select a group of frames of the encoded video content; process the digitally encoded video content to obtain a set of quantized transform coefficients of residual macroblocks or portions of residual macroblocks associated with each of the selected frames; identify a set of residual macroblocks per frame whose transform coefficients satisfy a threshold criterion; and generate a digital video fingerprint for the encoded video content in dependence upon the identified macroblocks or some property thereof (e.g. their locations) within each of the selected frames.

According to a fifth aspect of the present invention, there is provided a digitally encoded video fingerprinting system comprising: a fingerprint database; and a video processing subsystem, the video processing subsystem including: a fingerprint sequence selection module which is operable to select one or more sets of frames to be processed in order to generate a fingerprint; a fingerprint calculation module which is operable to generate a fingerprint based on a set of frames selected by the fingerprint sequence selection module using a method as set out in the first aspect of the present invention; and a fingerprint comparator module which is operable to compare two fingerprints and to output a similarity score of the compared fingerprints. Preferably, the fingerprint comparator is operable to compare a fingerprint generated by the fingerprint calculation module with a fingerprint extracted from the fingerprint database.

Preferably, the system of the fifth aspect of the present invention is operable to receive a data file comprising an unknown digital video in encoded form, and to iteratively generate a series of test fingerprints and to compare each test fingerprint with every fingerprint stored in the database, until either all of the generated test fingerprints have been compared with the fingerprints contained in the fingerprint database without a match having been found, or until a match is found, wherein the system determines that a match has been found in the event that the fingerprint comparator module determines that the similarity score exceeds a predetermined threshold of similarity.

Further aspects of the present invention relate to apparatus and devices for performing the methods of the first and second aspects of the present invention, as well as to computer programs for performing such methods and to carriers, most preferably non-transient carriers such as magnetic or optical discs, or solid-state storage devices, etc., carrying such programs.

BRIEF DESCRIPTION OF THE DRAWINGS

In order that the present invention may be better understood, embodiments thereof will now be described, by way of example only, with reference to the accompanying drawings in which:

FIG. 11 is a schematic illustration similar to FIG. 10 in which only the macroblocks whose associated totalised averaged basis function weights are within the top tenth percentile have their totalised averaged basis function weights overlaid thereover;

DETAILED DESCRIPTION OF SPECIFIC EMBODIMENTS OF THE PRESENT INVENTION

Overview of First Embodiment

Figure 1:
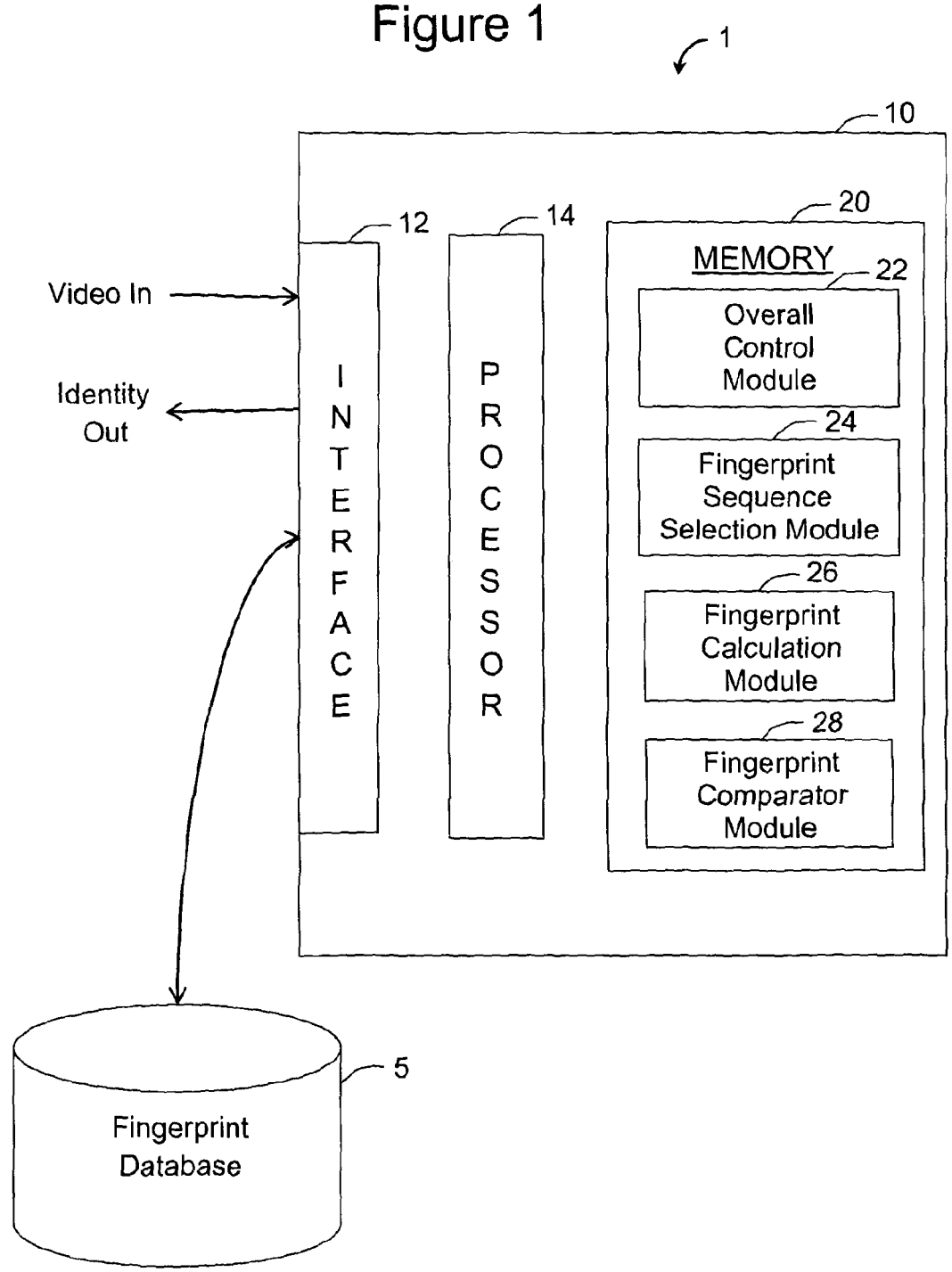
FIG. 1 is a schematic illustration of a digitally encoded video fingerprinting system according to an embodiment of the present invention.

FIG. 1 illustrates a fingerprinting system 1 according to a first embodiment of the present invention. The system 1 comprises a fingerprint database 5 and a video processing sub-system 10. The video processing sub-system 10 includes an interface 12, a processor 14 and a memory 20. The memory 20 stores processor instruction sets (i.e. software) as well as working data in the normal manner for computer systems. As would be expected it contains a large amount of standard software (e.g. the operating system and associated software components, etc.) which is not explicitly illustrated in FIG. 1 nor is it discussed further here since it is not pertinent to the present invention. However, in addition to the standard software components, the memory 20 additionally stores the processor instructions which implement the following four functional modules which are pertinent to the present invention: an overall control module 22, a fingerprint sequence selection module 24, a fingerprint calculation 26 and a fingerprint comparator module 28.

A more detailed description of the functionality of each of these modules is given in more detail below when discussing the various operations performed by the system 1. However, in overview, the overall control module 22 is operable to provide the overall control of the operation of the sub-system 10 in general, calling upon the services of the other three modules 24, 26, 28 as necessary. In particular, it provides a user interface to permit a user to control the mode of operation of the sub-system and it oversees the transfer of data through the interface 12 generally. It also controls the mode of operation of the sub-system 10 (in particular allowing the sub-system 10 to switch between a first mode of operation in which fingerprints are generated in respect of known pieces of video content and then used to populate the fingerprint database 5, and a second mode of operation in which an unknown piece of encoded video is provided to the sub-system for analysis and to see if a match can be found with a known piece of video content from the fingerprint database 5.

Similarly, in overview, the fingerprint sequence selection module 24 is responsible for performing a partial decoding of the encoded video data (the reason for this is explained in greater detail below) and for selecting and then outputting sequences of frames within the encoded video data being analysed for consumption by the fingerprint calculation module 26 (which then generates a fingerprint from the sequence). The sequence selection module 24 can operate in a number of different ways. For example, when the sub-system 10 is operating in its first mode of operation (i.e. analysing a known piece of video content) the selection module 24 conveniently searches for an optimum sequence and returns just that.

However, when the sub-system 10 is operating in the second mode of operation (i.e. trying to match an unknown piece of video content to a known piece of video content whose fingerprint is stored in the database 5) the sequence selection module 24 generates a series of sequences. In the present embodiment, the fingerprint sequence selection module 24 when operating in the second mode of operation simply selects every possible sequence of the appropriate (target) length (e.g. using a sliding window technique). This is appropriate in the present embodiment because of the complexity of the process used to identify an optimum sequence when operating in the first mode of operation.

Note however that in alternative embodiments, a less complex algorithm could be employed to identify an "optimum" sequence in which case the fingerprint selection module could be arranged to select sequences which are reasonable candidates (according to the criteria used when it is operating in the above described mode of operation where it simply selects an optimum sequence—the exact criteria used in the present embodiment are explained in greater detail below).

Such multiple reasonable candidates could then be output by the module either in the order in which they appear in the encoded video content being analysed or in an order of optimality or reasonableness. Instead of selecting and outputting sequences of frames of exactly the length required for the fingerprint calculation module 26 (the target sequence length), the sequence selection module may initially at least select super sequences of frames which are longer than the target length (target plus margin length super-sequences). These target plus margin length sequences can then be either provided as they are to the fingerprint calculation module for it to do its own sliding window technique, or the sequence selection module 24 could perform its own sliding window technique to output all sequences of the target length which are contained in the target plus margin length super-sequence. The target plus margin length super-sequence may possibly be centred on an optimum sub-sequence of the target length within the target plus margin sequence. Where two sequences, which are classified as being reasonable and are therefore initially at least selected, overlap, the selection means preferably combines these sequences into an extended super-sequence and either outputs this extended super-sequence directly or else outputs every sequence of the target length contained in the extended super-sequence using a sliding window approach, etc.

The fingerprint calculation module 26 generally takes a sequence of frames of (partially) encoded video data provided by the fingerprint sequence selection module 24 and processes these so as to generate a "fingerprint". In the present embodiment, the fingerprint itself comprises a number (in this case four) of sets of identities of macro-blocks which satisfy (or, as is actually done in the present embodiment, whose decoded transform coefficients satisfy) some predefined criterion. In the present embodiment, the predetermined criteria relate to different groups of the decoded transform coefficients of a given macroblock. In the present embodiment, the four criteria used for each of the four sets of macroblock identities are whether a particular sub-set of the quantized transform coefficients (in particular of the averaged quantized transform coefficients $T1av(n,m)$—for a definition of which, see below) of a given macroblock sum up to above a predefined threshold, the sub-sets of the coefficients being the complete set of coefficients, the coefficients associated with predominantly horizontal spatial frequency, the coefficients associated with predominantly vertical spatial frequency and the (single) coefficient associated with "DC"— these components are described in greater detail below with reference to FIG. 9).

Note that in order to derive the transform coefficients from the encoded video content, it is necessary to do a partial decoding of the encoded video. The decoding involves performing an entropy decode and inverse quantization. In the present embodiment, these decoding steps are performed by a conventional decoder. In the present embodiment this is formed as software code which is part of the fingerprint sequence selection module code means 24. However, it could be located in other parts of the sub-system 10 (e.g. at least part of the decoding functionality could be provided in the fingerprint calculation module code means 26 or it could be a stand-alone module with which the other illustrated modules interact, or it could formed substantially externally to the sub-system 10 altogether in which case the sub-system 10 would only process partially decoded video content, especially if specialised hardware adapted to performing video decoding is employed for this purpose, etc.).

When the sub-system 1 is operating in the first principal mode of operation, the calculated fingerprint is stored in the database 5 together with the (known) identity of the video content from which the fingerprint has been calculated. However, when operating in the second principal mode of operation, the overall control module 22 causes the calculated fingerprint to be passed to the fingerprint comparator module 28 for comparison with the fingerprints stored in the fingerprint database 5.

The fingerprint comparator module 28 is operable to compare an input fingerprint (provided to it by the overall control module 22 after calculation by the fingerprint calculation module 26) with each fingerprint stored in the fingerprint database 5 looking for a correlation or match. If a match is found it reports this to the overall control module 22. In alternative embodiments it may report if more than one possible match is found with associated levels of correlation so the overall control module may take appropriate action (e.g. reporting all possible matches to a user or selecting one or some as most likely and disregarding the others based on the reported correlation scores, etc.).

In the present embodiment, correlation is determined simply by finding the total number of matching macroblocks in each corresponding set of macroblock identities (for example, if the set of the identities of macroblocks, in respect of the first frame of one fingerprint, whose coefficients associated with predominantly horizontal spatial frequency exceed some predefined threshold, contain 10 macroblock identities which are also present in the corresponding set (i.e. relating to coefficients associated with predominantly horizontal spatial frequency and in respect of the first frame of the fingerprint) then the total correlation score would be incremented by 10. Optionally this (i.e. the total correlation score) can be normalised by, for example, dividing the final figure by the total number of macroblock identities contained in one of the fingerprints (e.g. the target fingerprint extracted from the fingerprint database).

In alternative embodiments, different correlation techniques could be used. For example some sort of machine learning algorithm (for example an artificial neural network) could be employed to generate a correlation score.

Figure 2:
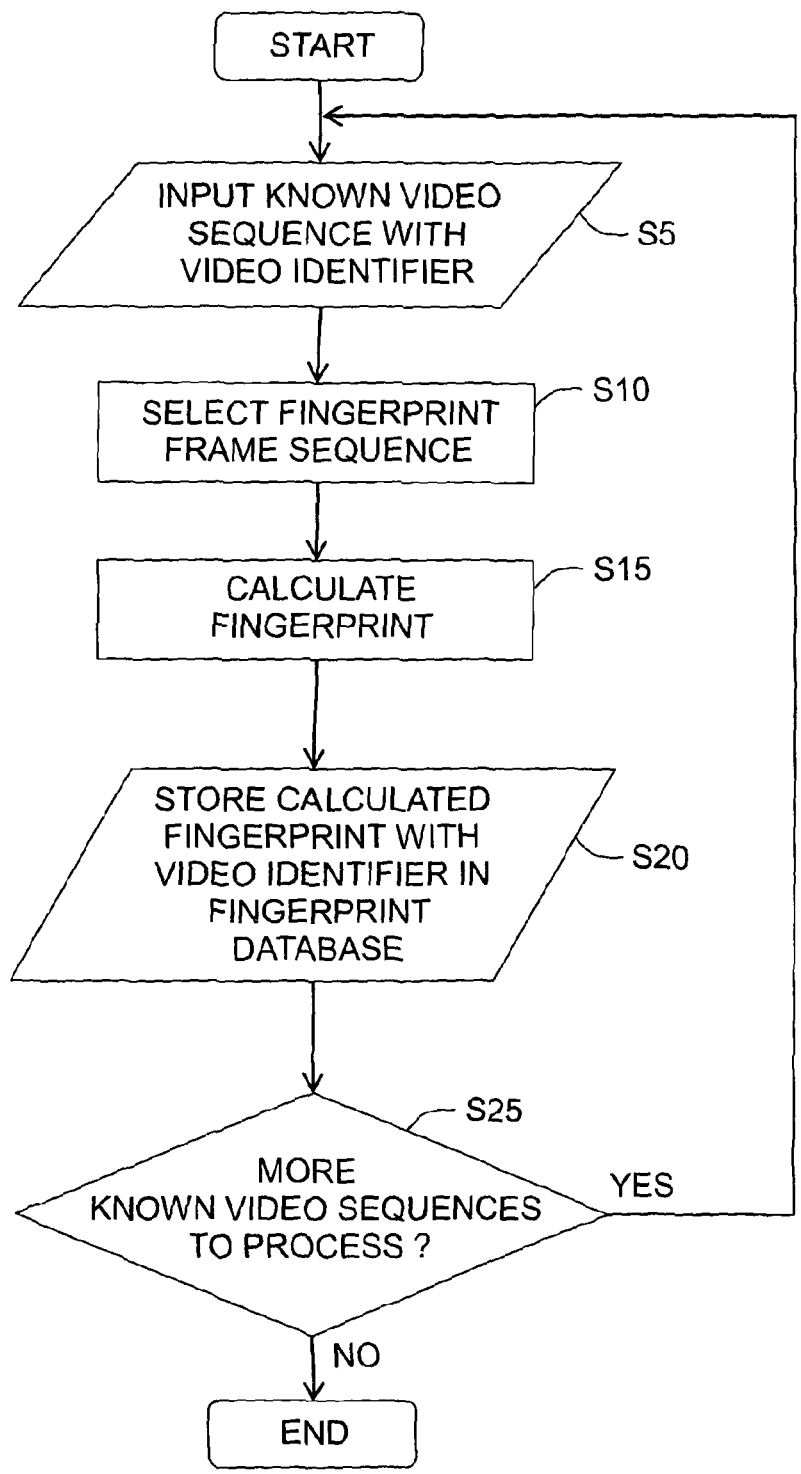
FIG. 2 is a flowchart of a method performed by the system of FIG. 1 in order to create, update, maintain, etc., a fingerprint database for use in identifying unknown digitally encoded video sequences.

Referring now to FIG. 2, a method for generating a fingerprint sequence from an input known piece of video in a digitally encoded and compressed format using the system of FIG. 1 is now described. This describes the operation of the system 1 in its first mode of operation. The method commences at step S5 with a known video sequence, together with a video identifier identifying the known video sequence, being entered into the sub-system 10 via the interface 12. The method then proceeds to step S10 in which a fingerprint frame sequence is selected (by the fingerprint sequence selection module 24); the full details of this process are discussed in greater detail below, but in overview, the input video is partially decoded to generate a sequence of residual frames (see below) and then these are processed to identify an optimum sequence of frames of a predetermined length (in terms of number of frames) and then the selected sequence is output. The precise measure of optimaility employed by the present embodiment is described below but the main thrust is to identify a sequence having strong robustness to the precise method of encoding used to encode the video sequence being considered.

Upon completion of step S10, the method proceeds to step S15 in which a fingerprint is calculated based on the sequence output by the preceding step. In the present embodiment, this is performed by the fingerprint calculation module 26.

Upon completion of step S15, the method proceeds to step S20 in which the calculated fingerprint is stored in the fingerprint database 5 together with the originally input video identifier. The method then proceeds to step S25 in which it is checked if there are more known video's to be processed. If so, the method returns to step S5, otherwise the method ends.

Figure 3:
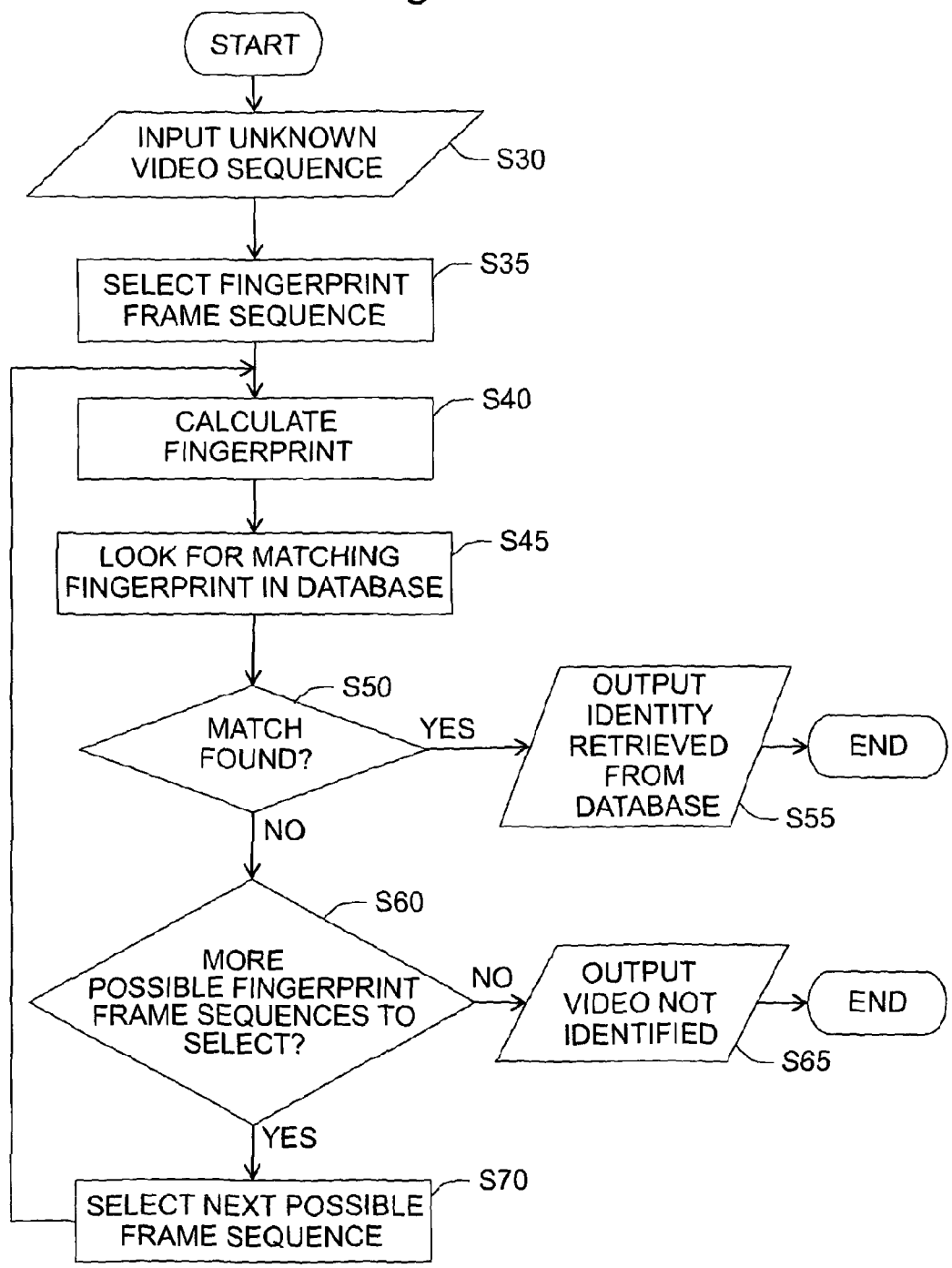
FIG. 3 is a flowchart of a method performed by the system of FIG. 1 in order to attempt to identify input unknown digitally encoded video sequences.

Referring now to FIG. 3, there is now described a method of operation of the system 1 in order to try to identify a piece of unknown compressed video by generating one or more fingerprints from the unknown video and comparing this or these with fingerprints stored in the fingerprint database to look for a match. This method is that of the system 1 when operating in the second mode of operation. The method described now is a fairly simple method for operating the system in the second mode of operation; alternative embodiments could employ more sophisticated methods with a concomitant increase in complexity and processing required etc.

The method commences with step S30 in which an unknown compressed video sequence is input to the sub-system 10 via the interface 12.

The method then proceeds to step S35 in which a fingerprint frame sequence is selected. In the present embodiment, this is done by the fingerprint sequence selection module. In the present embodiment, the fingerprint sequence selection module is configured to always generate a sequence of the same number of frames. This is a straightforward simple approach for providing corresponding fingerprints for comparison purposes where the frame rate of the video sequences being processed is always the same (i.e. for both the known and the unknown video sequences).

This simple approach ignores a potential complexity which is that video sequences may not always be encoded at the same frame rate. In such a case, for the present embodiment to function correctly it would be necessary to first process the unknown input video to obtain (i.e. to convert it to) the correct frame rate (tools exist which can perform this function though the processing cost would negate the main (low processing) benefits of the present invention so it is not an ideal solution). Alternative embodiments could provide a number of different systems like system 1 each of which is used to process video at just one particular frame rate. It would be possible to generate many different versions of a single known piece of video at different frame rates in order to populate these different systems with multiple versions of the same known piece of video at different frame rates (this would require a large amount of initial pre-processing but would be a better solution in terms of the processing cost of performing a match). When an unknown video piece is received by such a system it can either be analysed to identify the frame rate (probably the better solution, especially where the frame rate is explicitly given in the received piece of unknown video—e.g. as part of the meta data of the file), or it can just be tested against each different frame rate sub-system.

A further alternative (more sophisticated) embodiment could generate the fingerprint just for one version of the known video, but would explicitly store together with the fingerprint and the video ID this frame rate. If an unknown compressed video file is received it is analysed to determine its correct frame rate (this may be specified as part of its meta data for example—e.g. as a property of the file) then a more sophisticated algorithm could generate a fingerprint sequence whose "duration" (i.e. number of frames divided by frame rate) equals the duration of the stored fingerprint sequence that it is to be compared against and frames which do not closely correspond with frames in the other sequence could be ignored—e.g. if the known finger print was calculated on a video stream having twice the frame rate of the unknown video stream, every alternate "frame" in the known fingerprint could be ignored such that the final fingerprints being compared correspond with each other; this solution would require no additional pre-processing and considerably less processing at run time than converting the unknown video into a different frame rate.

There is a similar potential complexity associated with the possibility of video sequences having differing resolutions and being cropped to different degrees etc. These are discussed in more detail below, but in principle it will be apparent that they can be tackled in a similar way using similar strategies to those described above with respect to differing frame rates.

Upon completion of step S35, the method proceeds to step S40 in which a fingerprint is calculated (by the fingerprint calculation module 26) based on the sequence of (partially decoded) frames selected in step S35.

Upon completion of step S40, the method proceeds to step S45 in which the fingerprint calculated in the preceding step is compared (by the fingerprint comparator module 28) with all of the fingerprints stored in the fingerprint database 5. The method then proceeds to step S50 in which it is determined whether or not a match (or matches) was (were) found. If so, the method proceeds to step S55 in which the identity (identities) of the video(s) whose fingerprint(s) matched are output (under the control of the overall control module 22) and then the method ends. If on the other hand it is determined at step S50 that no match was found, then the method proceeds to step S60.

At step S60, it is determined whether or not there are more possible fingerprint frame sequences to select from the received unknown video. If there are no more appropriate sequences to select, then the method proceeds to step S65 in which it is output (by the overall control module 22) that the received video has not been successfully matched to any of the known videos contained in the fingerprint database 5, and then the method ends.

If on the other hand it is determined at step S60 that there are more possible sequences to select, then the method proceeds to step S70 in which a previously unselected video sequence is selected and then the method loops back to step S40 to calculate a new trial fingerprint based on the newly selected sequence. Note that in view of the nature of the fingerprint (which is discussed below) if the new sequence overlaps with the previous sequence, then the calculation of the fingerprint for the new sequence can be based to an extent (which depends on the extent of the overlap) on the previous fingerprint. This is discussed below when considering the sliding window approach.

Fingerprint Calculation Employed in the First Embodiment

Figure 4:
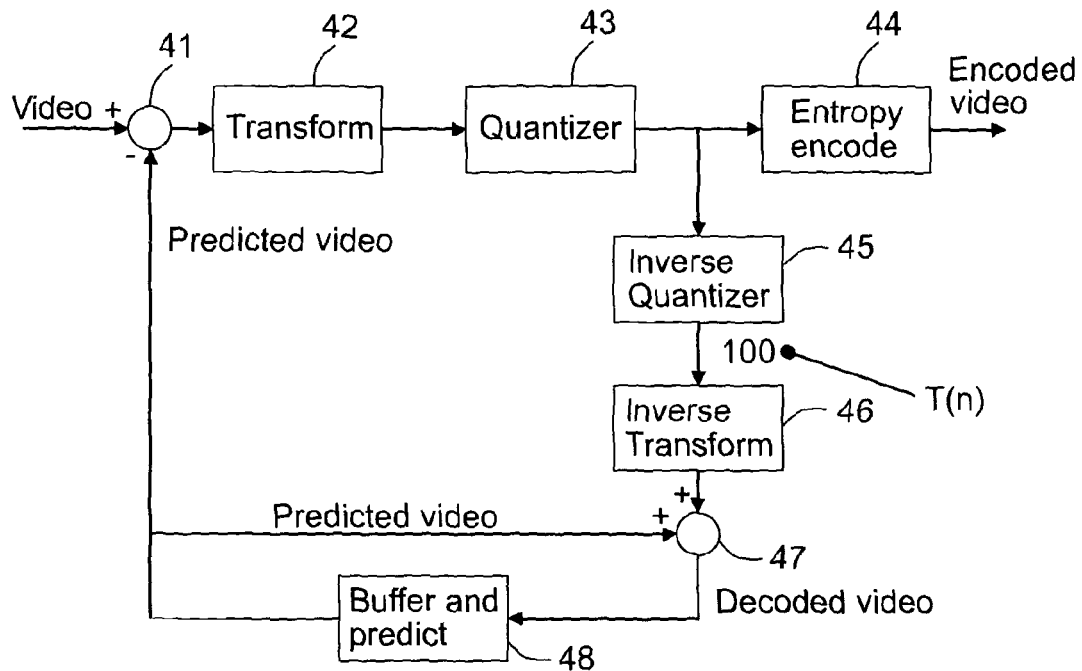
FIG. 4 is a schematic block diagram of a DPCM/DCT encoder.
Figure 5:
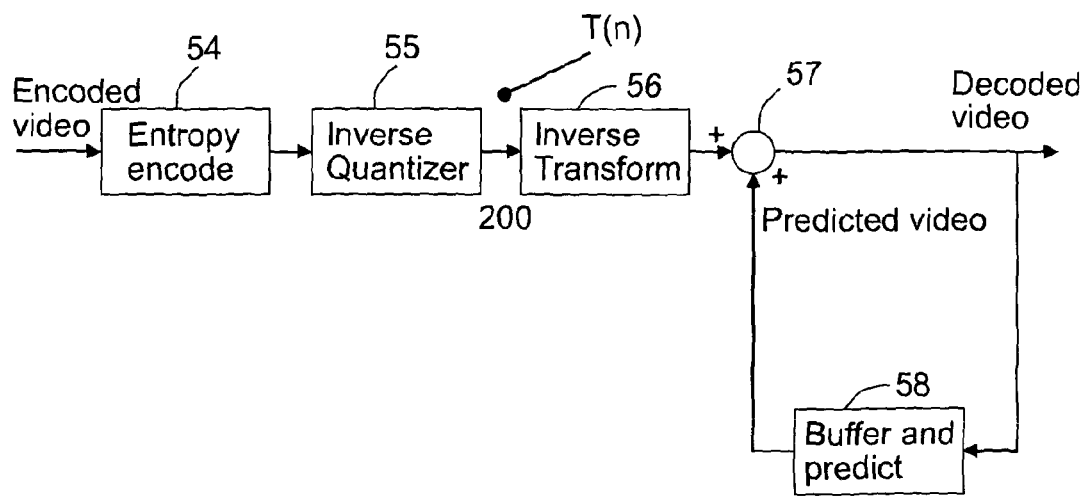
FIG. 5 is a schematic block diagram of a DPCM/DCT decoder which is employed in the system of FIG. 1.

The compressed-domain fingerprinting technique of the first embodiment applies to the widely used Differential-Pulse-Code-Modulation/Discrete-Cosine-Transform (DPCM/DCT) hybrid structure used in various forms since the early 1990s in standards such as H.261, H.263 and H.264. FIG. 4 shows a schematic block representation of a DPCM/DCT encoder 40 and FIG. 5 illustrates a corresponding decoder 50. The encoder 40 is typified by the following steps:
Analysis of the raw video frames in rectangular blocks of pixels or macroblocks.
Pixel domain prediction of macroblocks to remove spatial and temporal correlation. Transform of predicted macroblocks (commonly 2-dimensional Discrete Cosine Transform (DCT)).
Quantization of transform coefficients.
Entropy coding of information for transmission.

Thus the encoder 40 includes a subtractor 41 in which an input macroblock of video has a "predicted" version of the preceding frame subtracted to provide a "difference" frame. This difference frame is then passed to a transform module in which the difference frame is transformed (using in the present embodiment a 2-Dimensional Discrete Cosine Transform (DCT). The output transform co-efficients are then passed to a quantizer module 43 which quantizes the transform co-efficients as discussed below. Finally, the quantized transform co-efficients are entropy encoded at an entropy encoder module 44 and then the encoded video is transmitted. In order to generate a predicted frame which is provided to the adder 41, a copy of the quantized transform co-efficients (prior to entropy encoding) is also passed to an inverse quantizer 45 and then an inverse transform module 46 (these correspond identically so far as possible to the equivalent structures (55 and 56) in the decoder at the other end of the transmission circuit (comprising encoder 40, decoder 50 and intermediate transmission medium). The output of the inverse transform module 46 should be the difference between the input macroblock and the predicted macroblock from the preceding frame; this is then added at adder 47 to a copy of the predicted video macroblock which was initially subtracted from the input video macroblock at subtractor 41, thus generating a new predicted macroblock which is stored in a buffer and predict module 48 until it is needed when processing a new macroblock for which the stored predicted macroblock is selected as the best match.

The decoder 50 shown in FIG. 5 comprises an entropy decoder 54 (which seeks to reverse the entropy encoding performed by the entropy encoder 44), an inverse quantizer 55 (which seeks to reverse the quantization performed by the quantizer 43) and an inverse transform module 56 (which seeks to reverse the transform performed by the transform module 42—i.e. to transform the residual transform co-efficients back to (residual) pixels in the pixel domain). It also includes an adder 57 and a buffer and predict module 58. The buffer and predict module 58 supplies a reference macroblock to add to the residual pixels generated by the inverse transform module 56 and this provides the received and decoded macroblock. A copy of this is also stored in the buffer and predict module 58 for possible further use.

The pixel domain prediction of macroblocks involves the selection of a "best match" for a target macroblock from a buffer (48, 58) of reference frames and the subtraction of the "best match" from the target (at subtractor 41) to give a residual macroblock of lesser energy. This process produces a residual macroblock of lesser energy and with predictable image features removed. The residual signal will typically retain aspects of the more unpredictable image features such as evolving or revealed objects, moving edges and changing texture.

The residual macroblocks are then transformed (at transform module 42) into another domain prior to quantization (at quantizer module 43) to take advantage of further levels of decorrelation. As is typically the case, in the present embodiment, processing is performed in a combination of 1 luminance and 2 chrominance coefficients, with luminance resolution twice that of both the chrominance. All following consideration is limited to the luminance domain for ease of understanding.

Figure 6:
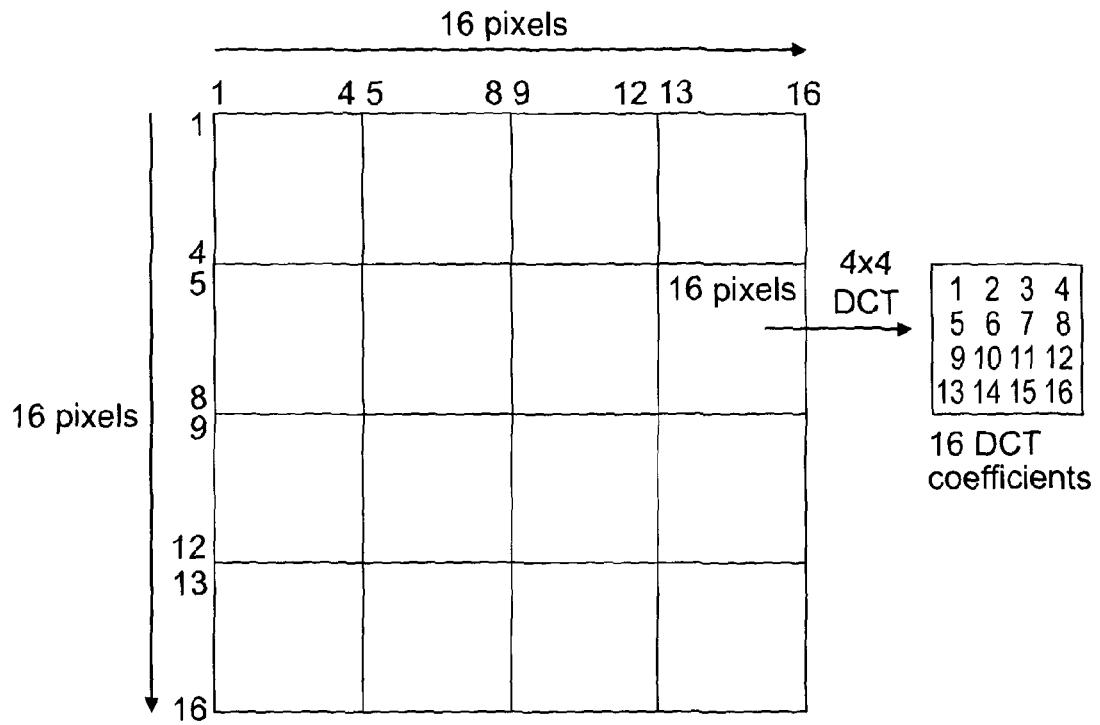
FIG. 6 is a schematic diagram of an H.264 Macroblock structure comprising 16×16 pixels divided into 16 sub-blocks of 4×4 pixels each.
Figure 7:
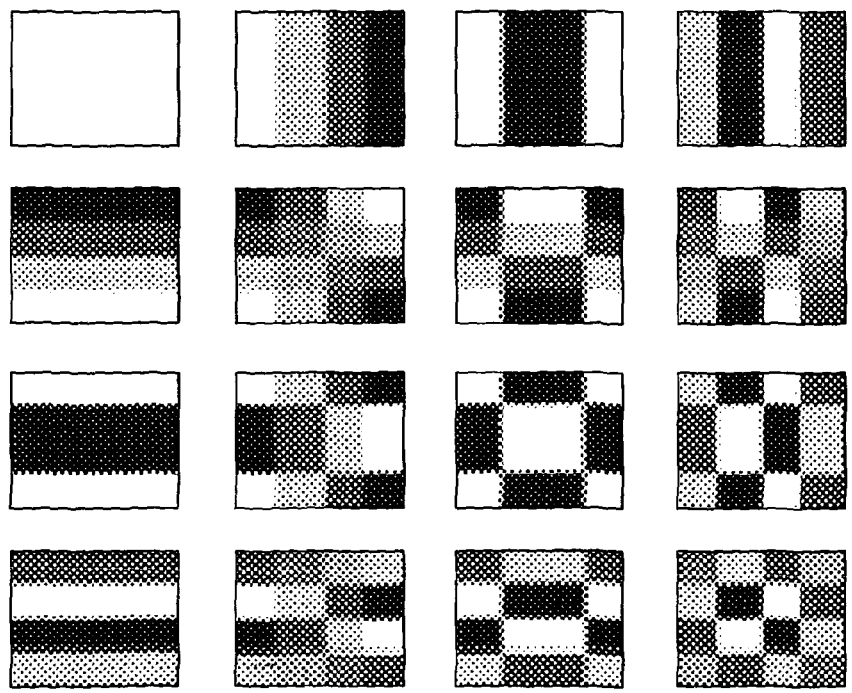
FIG. 7 is a schematic diagram of the 4×4 DCT basis functions of H.264.

The 2-dimensional DCT is used and (as specified for H.264) a 16×16-pixel residual macroblock is transformed using a set of 16 4×4 2-D DCTs. FIG. 6 shows the transform process for a 16×16 pixel macroblock in H.264, with each 4×4 16-pixel sub-block producing a corresponding 4×4 16-coefficient transform sub-block. The coefficients resulting from a 2-dimensional 4×4 DCT may be considered as weights of the set of basis patterns shown in FIG. 7. The original block of residual pixels may be reconstructed by combining all the corresponding weighted basis patterns.

The transform coefficients must then be quantized, typically using a scalar quantizer, in a trade-off of distortion with compression rate. The quantization process is controlled by a step-size factor that determines the precision of quantization and which may be adapted to control the instantaneous bit-rate of the encoder 40. The transform-quantization process is designed to remove perceptually less significant near-zero transform values by mapping them to zero, which adds significantly to the efficiency of the (entropy) encoding process.

The final stage of the encoding process is the efficient (entropy) encoding of all the information symbols required for transmission to the decoder 50. This includes the quantized transform coefficients, quantization step-size(s) and macroblock prediction information. Entropy coding techniques utilize correlation in these symbols to gain efficiency as is well known in the art.

Compressed-domain Fingerprinting

The fingerprint calculation method of the present embodiment uses transform coefficients recovered from the encoded bitstream by applying the entropy decoding and inverse quantization functions (provided by modules 54 and 55 respectively) of the decoder 50. This corresponds to the signal as it is at points 100 and 200 indicated in FIGS. 4 and 5 respectively (i.e. between modules 45 and 46 in FIG. 4 and between modules 55 and 56 in FIG. 5). The entropy decoding and inverse quantization functions are of relatively low complexity compared to the rest of the decoder 50, since no inverse DCT transformation is required and no operations are required to be performed in the image pixel domain. For an H.264 compressed stream, DCT information for each 16×16-pixel macroblock may be represented as shown in FIG. 8.

Figure 8:
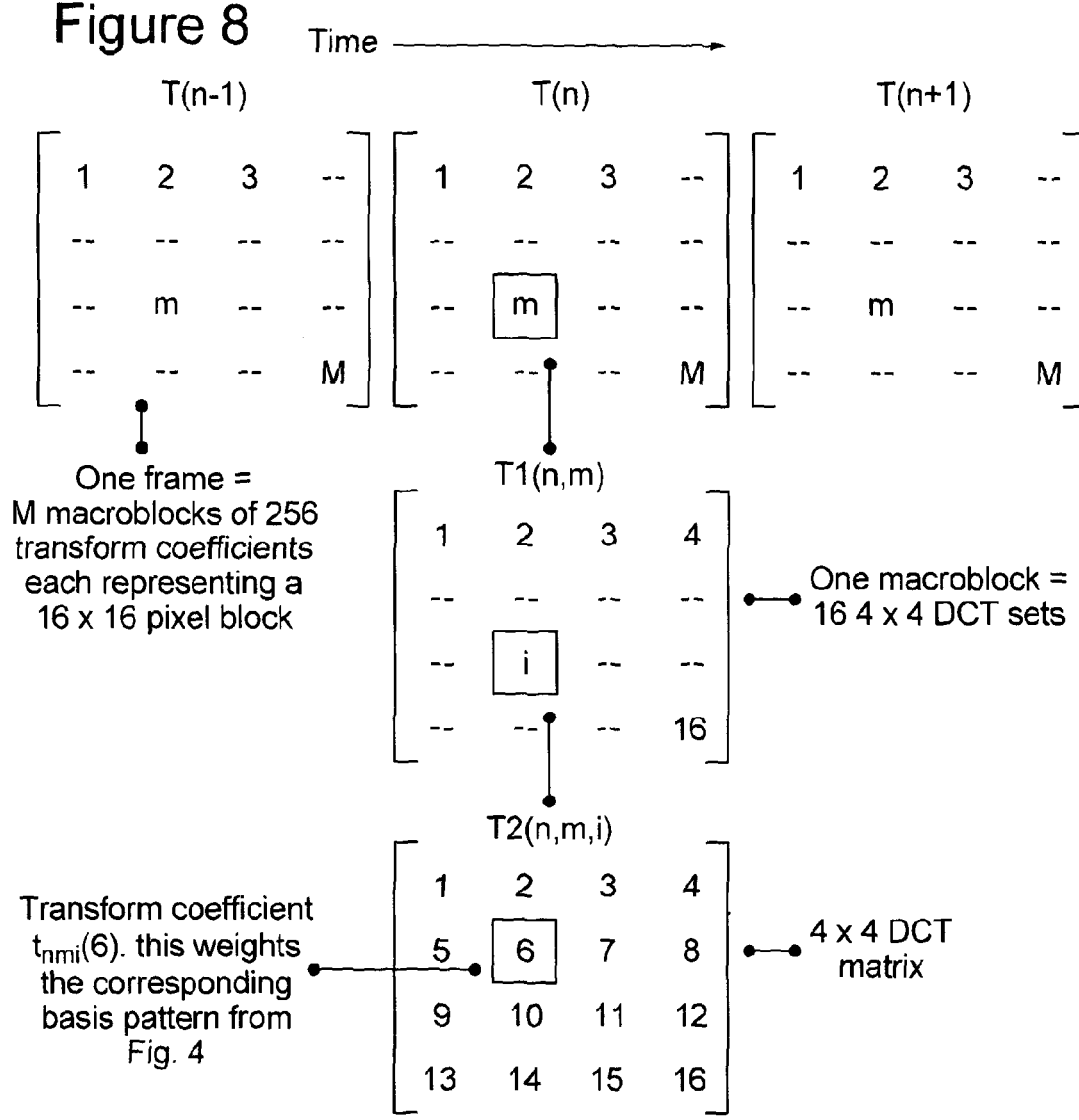
FIG. 8 is a schematic diagram illustrating how the DCT information for each 16×16 pixel macroblock may be represented according to the H.264 protocol.

In FIG. 8, T(n) represents the set of decoded transform coefficients for frame n (extracted as signals (100) and (200) from FIGS. 4 and 5 respectively) and T1(n,m) the set of decoded transform coefficients for macroblock m of frame n. The set T consists of M sets of transform data T1 according to equation (1) below, one set for each of the M macroblocks in the frame. Each macroblock set T1 consists of 16 sets of coefficients T2 according to equation (2) below, where each set T2 is made up of the 16 individual transform coefficients t according to equation (3) below.

$$T(n)=\{T1(n,m): m=1 \ldots M\} \quad (1)$$

$$T1(n,m)=\{T2(n,m,i): i=1 \ldots 16\} \quad (2)$$

$$T2(n,m,i)=\{t_{nmi}(j): j=1 \ldots 16\} \quad (3)$$

To make the transform information more manageable, a set of macroblock averages T1av may be defined according to equations (4) and (5) below, where corresponding coefficients from the 16 transform sets T2(n,m,1 ... 16) within a macroblock are averaged.

$$T1av(n, m) = \{tav_{nm}(i): i = 1 \ldots 16\} \quad (4)$$

$$tav_{nm}(j) = (1/16)\sum_{i=1}^{16} t_{nmi}(j) \quad (5)$$

Figure 9:
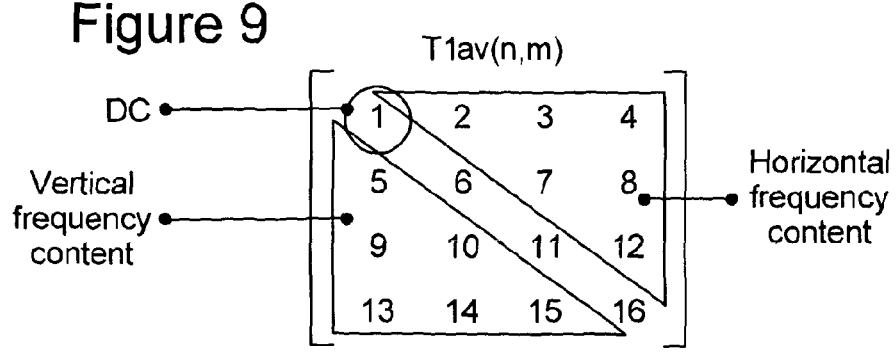
FIG. 9 is schematic diagram illustrating how the set, T1av(n,m) of averaged basis function weights associated with a macroblock may be partitioned to indicate useful properties of the residual signal and hence of the video sequence associated with that signal.

T1av(n,m) therefore represents a set of averaged basis function weights that reflects the power and nature of the residual signal for macroblock m of frame n. FIG. 9 shows how the set of coefficients within T1av may be partitioned to indicate useful properties of the residual signal. A measure of horizontal spatial frequency content H(n,m) may be calculated according to Equation (6) below and vertical according to Equation (7) below.

$$H(n, m) = \sum_{j \in S1} tav_{nm}(j) \quad (6)$$

$$V(n, m) = \sum_{j \in S2} tav_{nm}(j) \quad (7)$$

Set S1 defines the set of basis functions with predominantly horizontal spatial frequency with indexes j=2, 3, 4, 7, 8 and 12 and set S2 vertical spatial frequencies with indexes 5, 9 10, 13, 14 and 15. Other useful measures are a total measure T(n,m) and DC measure DC(n,m) calculated according to Equations (8) and (9) respectively, with set S3 including all transform coefficients (1-16).

$$T(n, m) = \sum_{j \in S3} tav_{nm}(j) \quad (8)$$

$$DC(n, m) = tav_{nm}(l) \quad (9)$$

Figure 10:
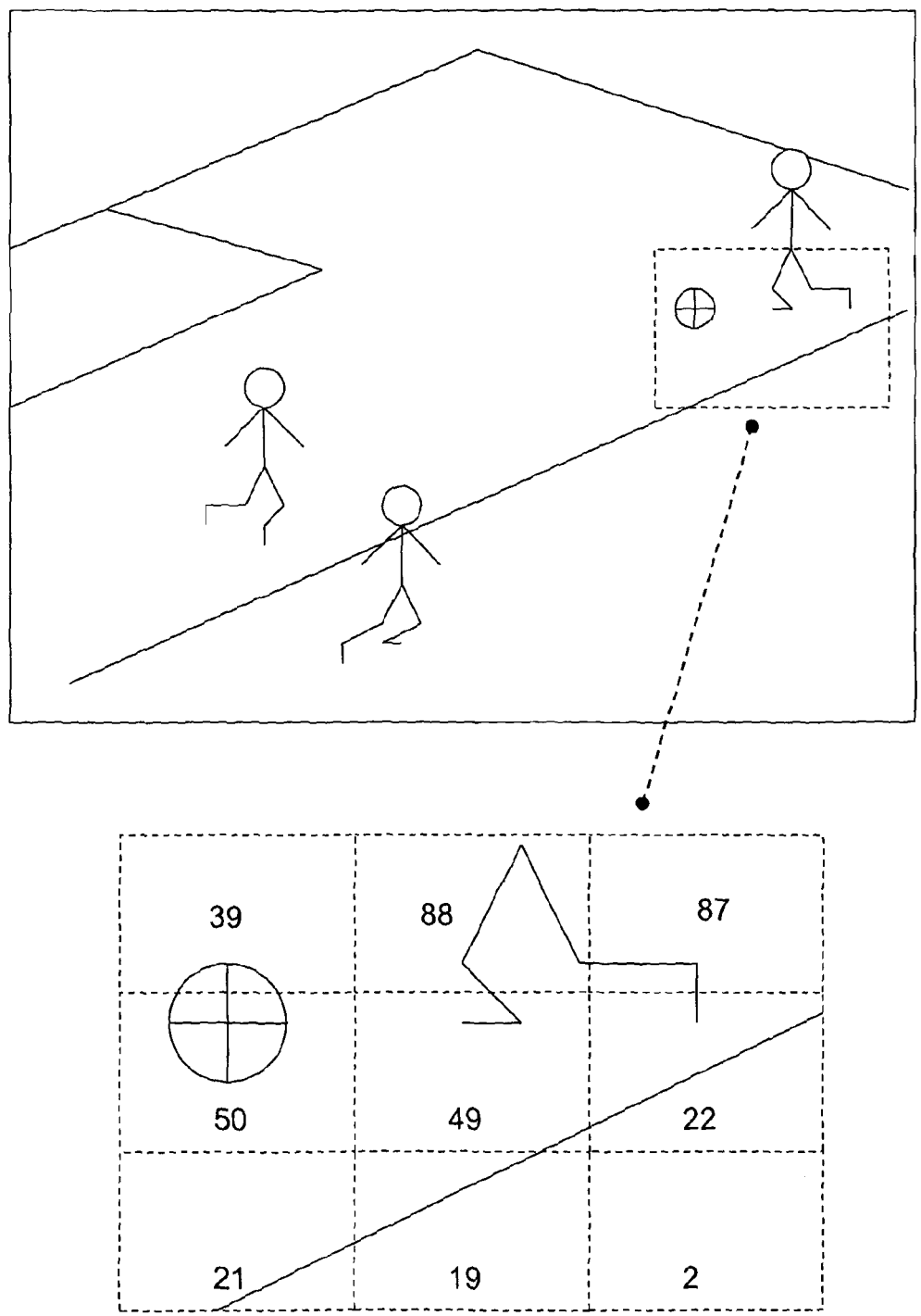
FIG. 10 is a schematic illustration of a frame from a video sequence and an expanded portion which shows the totalised averaged basis function weights, T(n,m), for respective macroblocks in the frame overlaid over their respective macroblocks.

The measures H, V, T and DC may be used to build up a map of features present in the residual signal and FIG. 10 shows (in the expanded portion) text values (e.g. 39, 88, 87, etc.) of T(n,m) over a schematic representation of the intensity pixels of the corresponding decoded image for a frame from a "Football" sequence. The "Football" sequence was compressed using H.264 compression with a variable Quantization Parameter value chosen to achieve a target output bit rate without causing buffer overflow (during hard content) or underflow (during easy content) and an encoding pattern I, P, B, B, P, B, B, P, . . . , I with an I-frame interval of 24. Areas of high DCT activity in FIG. 10 are indicated by high text values and correspond to unpredictable image features such as evolving or revealed objects, moving edges and changing texture.

A set of the macroblocks with the highest activity may be obtained by applying filtering according to Equations (10) and (11) below.

$$TF(n)=\{tf: tf=T(n,m), m \in M_{TF}(n)\} \quad (10)$$

$$M_{TF}(n)=\{m: T(n,m) > \text{Thresh}TF(n) \wedge m \in M(n)\} \quad (11)$$

In (10), set TF(n) has elements tf with amplitudes of T(n,m) for macroblock positions from the set $M_{TF}(n)$. In (11), set $M_{TF}(n)$ is defined as the macroblocks from analysis set M(n) that give a value of T greater than threshold ThreshTF(n). This method can also be applied to define horizontal, vertical and DC filtered sets according to Equations (12) to (17) below. Note that the analysis set M(n) could be the entire set of Macroblocks within frame n; however, the analysis set M(n) could also be some sub-set of this. For example the analysis set could exclude all of the macroblocks within a 4 macroblock margin around the periphery of each frame to achieve a sort of cropped effect. By adjusting the analysis set used, it is possible to accommodate the effects of video sequences having been cropped to different degrees by different encoding processes etc.

$$HF(n)=\{hf: hf=H(n,m), m \in M_{HF}(n)\} \quad (12)$$

$$M_{HF}(n)=\{m: H(n,m) > \text{Thresh}HF(n) \wedge m \in M(n)\} \quad (13)$$

$$VF(n)=\{vf: vf=V(n,m), m \in M_{VF}(n)\} \quad (14)$$

$$M_{VF}(n)=\{m: V(n,m) > \text{Thresh}VF(n) \wedge m \in M(n)\} \quad (15)$$

$$DCF(n)=\{dcf: dcf=DC(n,m), m \in M_{DCF}(n)\} \quad (16)$$

$$M_{DCF}(n)=\{m: DC(n,m) > \text{Thresh}DCF(n) \wedge m \in M(n)\} \quad (17)$$

The thresholds may be adapted on a frame-by-frame basis for each measure. In the present embodiment, the threshold value was set for each frame and measure such that the top 10% of activity values were selected from each frame per measure. FIG. 11 shows the set TF(n) for the data T(n) shown in the expanded box of FIG. 10 (for this frame/measure values above 48 represented the top 10% of values and as such, only values greater than 48 are shown in FIG. 11).

Digital Fingerprint Signature

For a frame n, the sets TF(n), HF(n), VF(n) and DCF(n) provide information on the nature of the highest activity regions of the residual signal. For the same source content, the absolute level of the elements of these sets will be affected by factors such as the prediction performance (MacroBlock (MB) prediction type and encoder implementation dependent), prefiltering of the source signal and the encoding bit rate. A degree of robustness to these variations is desirable if these values are to provide features that are useful for digital fingerprinting. This can be achieved by using the sets $M_{TF}(n)$, $M_{VF}(n)$, $M_{HF}(n)$ and $M_{DC}(n)$ to provide a 4-layered activity map of the frame and defining a fingerprint set FGP(n) for frame n according to Equation (18) below.

$$FGP(n)=(M_{TF}(n), M_{HF}(n), M_{VF}(n), M_{DCF}(n)) \quad (18)$$

A sequence of successive fingerprint sets may then be used to define a temporal fingerprint signature FGPS according to Equation (19) below, where $N_{FGPS}$ defines the set of frames over which the signature is calculated.

$$FGPS = \{fgp: fgp = FGP(n), n \in N_{FGPS}\} \quad (19)$$

If a target fingerprint signature is defined as FGPSt covering Nt successive frames, then the constituent individual frame fingerprints FGPt(n) may be defined according to Equation (20) below.

$$FGPt(n) = (Mt_{TF}(n), Mt_{HF}(n), Mt_{VF}(n), Mt_{DCF}(n)) \; n = 1 \ldots Nt \quad (20)$$

For a long query signal of Kq frames, where Kq>Nt, a corresponding fingerprint signature starting at frame k may be defined as FGPSq(k) and individual frame fingerprints may be defined according to (21).

$$FGPq(n) = (Mk_{TF}(n), Mk_{HF}(n), Mk_{VF}(n), Mk_{DCF}(n)) \; n = k \ldots k+Nt-1 \quad (21)$$

A search for a target digital fingerprint signature in a query signal may be achieved in the present embodiment by performing a sliding window analysis in which the target signature FGPSt is compared with query signatures FGPSq(k) from a sliding window of query frames (generated by the fingerprint sequence selection module 24). A window of query frames, the same length as the target signature, is used to generate a query signature, which is then compared with the target signature using a suitable distance measure (see below). The query window is then moved forward by one frame and the signature comparison repeated. Note that the signature generation FGPSq(k+1) can thus be calculated (by the Fingerprint calculation module 26) simply by removing FGPq(k) from, and adding FGPq(k+Nt) to, FGPSq(k). In the simplest form of the present embodiment, a threshold comparison is applied to the results to indicate a possible match to the target in the query signal. A search for the digital fingerprint signature FGPSt in a query signal is achieved by performing a sliding window analysis according to Equations (22) and (23) below.

$$FGPM = \max(fgpmatch(FGPSt, FGPSq(k))) \quad (22)$$
$$k = 1 \ldots Kq - (Nt-1)$$

$$fgpmatch = \quad (23)$$
$$(1/Nt) \sum_{n=1}^{Nt} [fgpm(Mt_{TF}(n), Mk_{TF}(k+n-1)) + fgpm(Mt_{HF}(n), Mk_{HF}(k+n-1)) + fgpm(Mt_{VF}(n), Mk_{VF}(k+n-1)) + fgpm(Mt_{DCF}(n), Mk_{DCF}(k+n-1))]$$

In Equation (23) above, function fgpm(Mt,Mk) returns a count of the number of coincident macroblock positions between the sets Mt and Mk, Results—Robustness and Reliability A useful fingerprint scheme needs to offer robustness and reliability. Robustness is shown by the reliable detection of the same source signal under different encoding conditions. Reliability is shown by a low count of "false detection", where query content is incorrectly matched against a target signature.

Single-frame Fingerprint Reliability and Robustness

Figure 12:
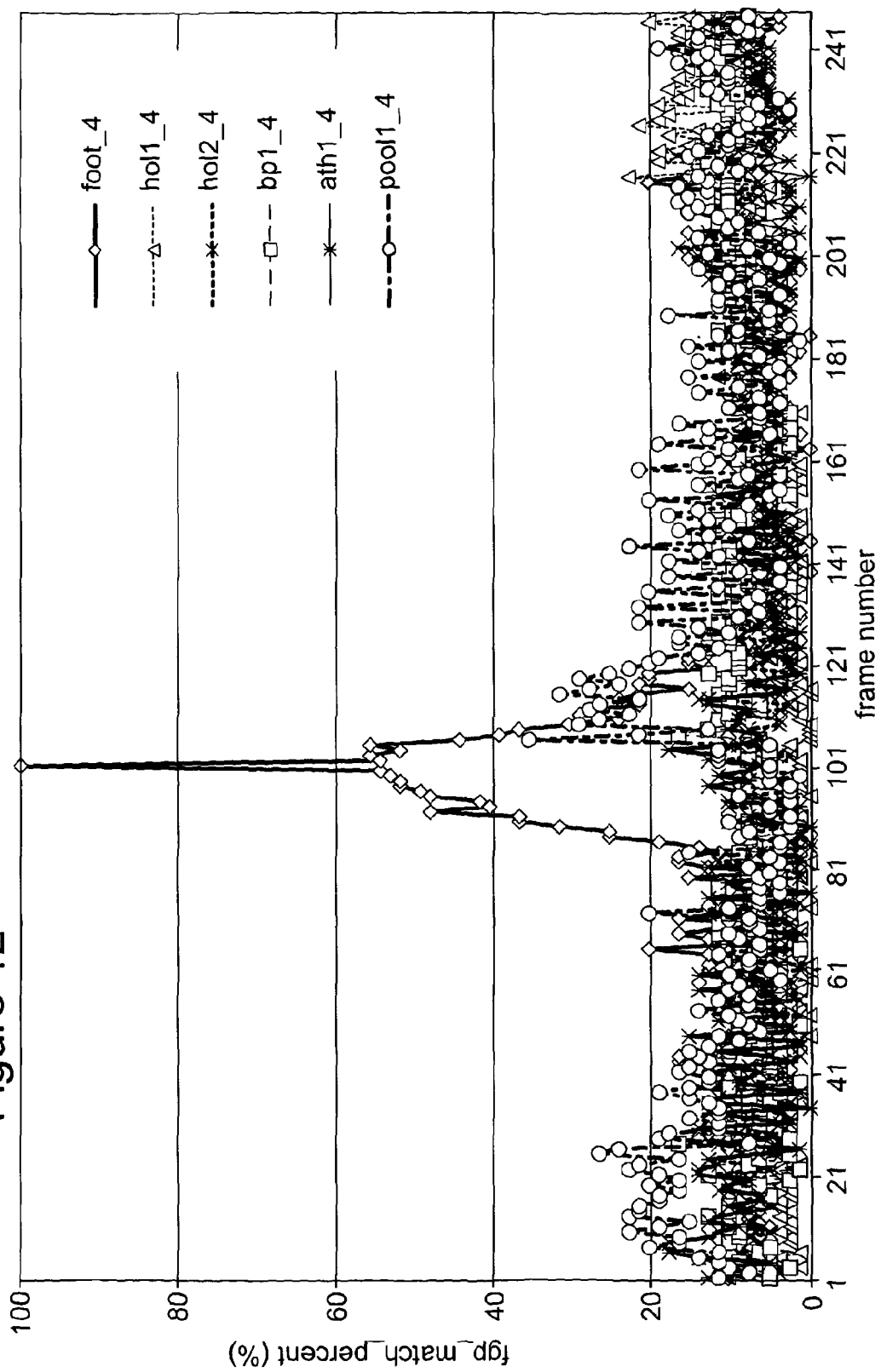
FIG. 12 is a graph showing the degree of match between a target fingerprint obtained from a single frame of a video sequence called "foot_4" and a plurality of query video sequences (including the video sequence foot_4)

A fingerprint was derived for frame 101 of a 4 Mbit/s sequence "Foot1_4" using Equations (10) and (11) above with an activity threshold set to keep the top 10% of values of the frame (as shown in FIG. 11—note it is the top 10% of values of the frame as a whole—FIGS. 10 and 11 in the expanded portion show mostly high value macroblocks and so clearly more than 10% of the macroblocks in FIGS. 10 and 11 are within the top 10% of the frame as a whole which is why they still appear in FIG. 11). The fingerprint matching procedure specified in equations (22) and (23) was then applied to compare the single frame "target" fingerprint for frame 101 with each frame (frames 1.250) of the same 8 second sequence and 5 different 8 second sequences. The resulting values of fgpmatch calculated from Equation (23) above with the signature length Nt set to 1 are shown in FIG. 12. The results show good discrimination of the target fingerprint with a maximum other-sequence match of 35% from frame 106 of sequence "pool1_4".

Figure 13:
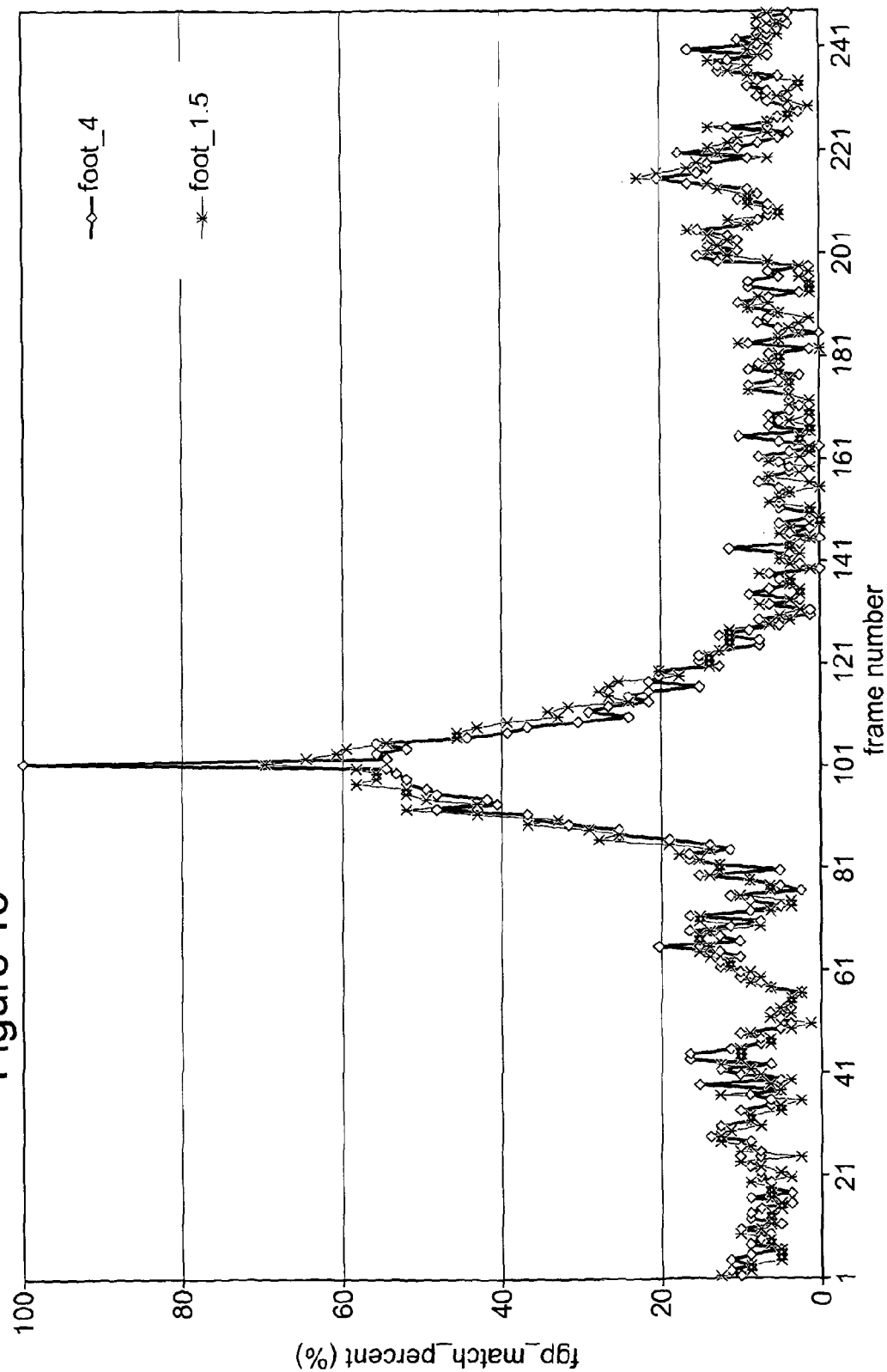
FIG. 13 is a graph showing the degree of match between a target fingerprint obtained from a single frame of the video sequence called "foot_4" and query video sequences "foot_4" and "foot_1.5"—the video sequence foot_1.5 being of the same video footage as that of foot_4 but encoded at a different rate of encoding (at 1.5 Mbit/s instead of the 4 Mbit/s at which foot_4 is encoded)

A 1.5 Mbit/s encoded version of the "Foot1_4" sequence (Foot1_1.5) was included in the tests to demonstrate the robustness of the single-frame fingerprint detection. FIG. 13 compares the 4 Mbit/s and 1.5 Mbit/s results and shows a 70% match for frame 101 and 15 frames with a match >40% around frame 101.

The Football sequences Foot1_4 and Foot1_1.5 are encoded at the same size and frame-rate as one another and the lower bit rate of Foot1_1.5 (of 1.5 Mbit/s) is achieved through use of a larger QP. These sequences are "fixed" bit-rate encoded, where there is a target bit-rate and a fixed buffer size for the encoded bits, and the QP is varied within and between frames in response to the buffer state. The buffer is emptied at the desired bit-rate and the QP is adjusted to stop buffer overflow for difficult content or buffer underflow for easy content. On average the QP for the 1.5 Mbit/s encoding is about 25 and for 4 Mbit/s is about 13.

Fingerprint Signature Reliability

Figure 14:
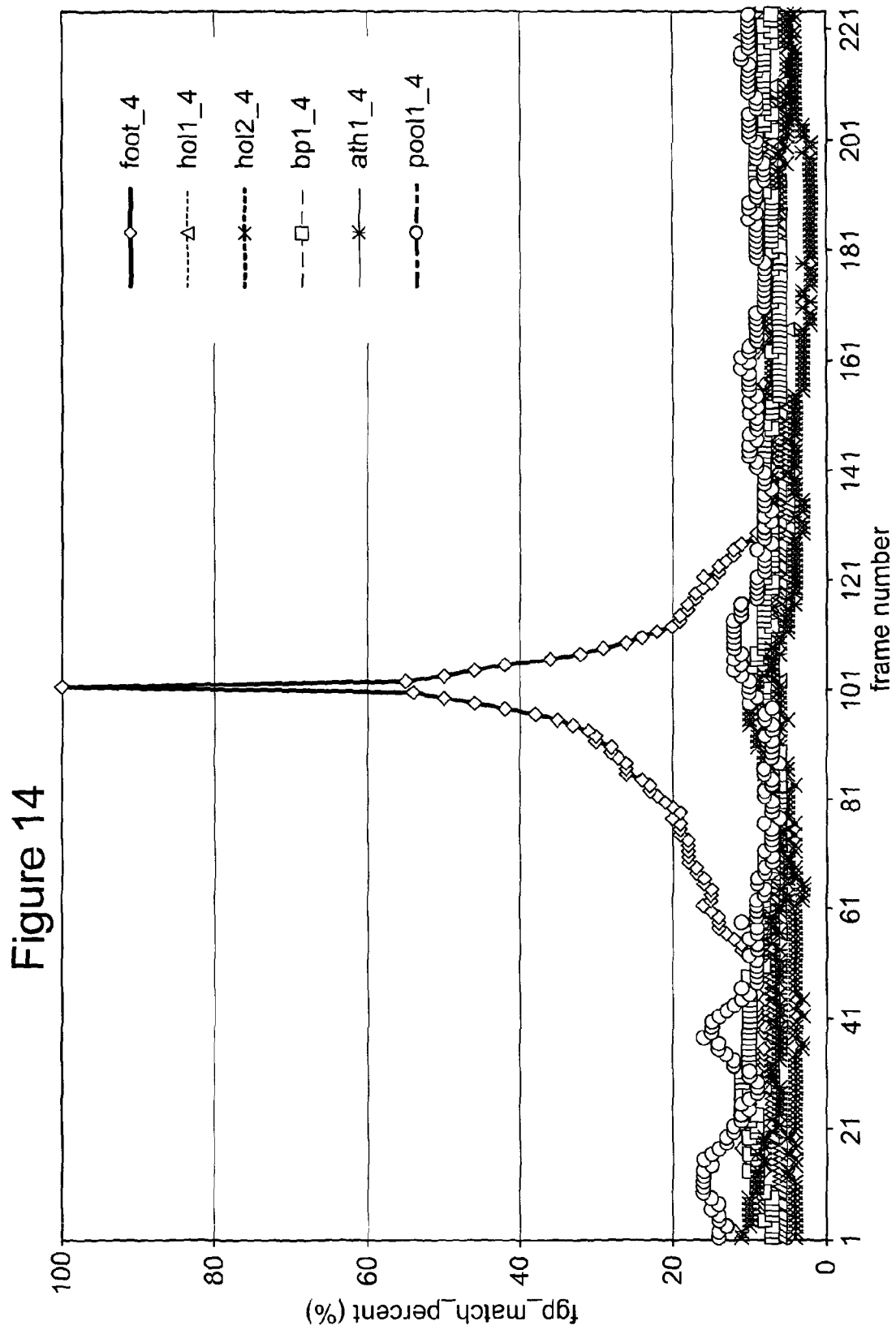
FIG. 14 is a graph showing the degree of match between a target fingerprint obtained from 25 frames of a video sequence called "foot_4" and a plurality of query video sequences (including the video sequence foot_4)

A 25-frame fingerprint signature was derived for frames 101 to 125 of the 4 Mbit/s sequence "Foot1_4" using the 10% activity threshold applied above. The fingerprint matching procedure specified in Equations (22) and (23) above was then applied to compare the 25-frame "target" fingerprint signature for frames 101-125 with a sliding 25-frame window for the same 8 second sequence and 5 different 8 second sequences. The resulting values of fgpmatch calculated from (23) with the signature length Nt set to 25 are shown in FIG. 14. The results show improved discrimination of the 25-frame target signature over the 1-frame fingerprint with a maximum other-sequence match of 16% for sequence "pool1_4".

Figure 15:
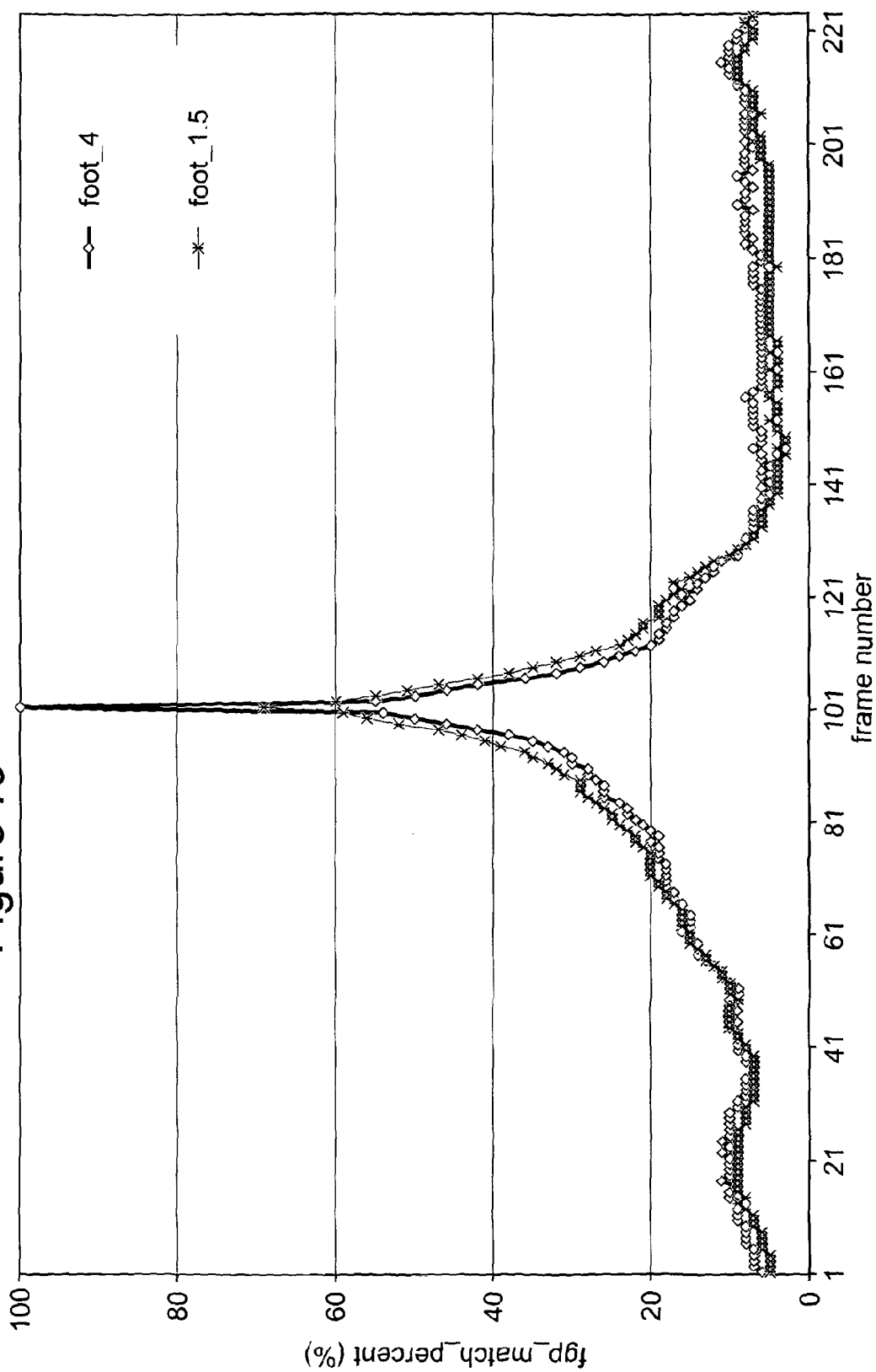
FIG. 15 is a graph showing the degree of match between a target fingerprint obtained from 25 frames of the video sequence called "foot_4" and query video sequences "foot_4" and "foot_1.5"

A repeat of the robustness test with the 1.5 Mbit/s encoded version of the "Foot1_4" sequence demonstrates the expected no change in robustness for the 25-frame signature as shown in FIG. 15.

Signature Selection

Reliable digital fingerprinting from the transform parameters in the compressed domain of a DPCM/DCT hybrid video codec requires the presence of strong features in the residual signal. Such features relate to the more unpredictable image properties, such as evolving or revealed objects, moving edges and changing texture. The 25 frames (frames 101 to 125) of the 1 second fingerprint signature tested for the 4 Mbit/s "Foot1_4" sequence show footballer players running with a football. Here, the moving players and ball against the plain (grass) background provide the strong features required for reliable discrimination.

However, many video sequences will contain scenes or parts of scenes that contain insufficient residual features for robust and reliable fingerprint discrimination. It is important, therefore, to select fingerprint signatures from feature-rich points in the DCT domain video sequence. One possible technique for selecting such signatures involves the sliding window analysis of differently encoded versions of the target sequence and this approach (which is described below) is the one adopted in the present embodiment.

A target sequence may be analysed by first defining a sliding target signature FGPSt(m) according to Equations (24) and (25) below.

$$FGPSt(m) = \{fgp: fgp = FGPt(n), n \in N(m)_{FGPS}\} \quad (24)$$

where $N(m)_{FGPS}$ defines the set of frames making up the signature for FGPSt(m). If a target fingerprint signature covers Nt successive frames, then the constituent individual frame fingerprints may be defined according to (25).

$$FGPt(m) = (Mt_{TF}(n), Mt_{HF}(n), Mt_{VF}(n), Mt_{DCF}(n)) \, n=m \ldots m+Nt-1 \quad (25)$$

where m represents the starting frame of the sliding target window.

Using the query signal signature definition of FGPSq(k) from (21), where k represents the starting frame of the sliding signature window in the query signal, the best match for each target signature FGPSt(m) from all query signatures FGPSq(k) may be calculated according to Equation (26) below.

$$FGPM(m) = \max(fgpmatch(FGPSt(m), FGPSq(k))) \\ k=1 \ldots Kq-(Nt-1) \quad (26)$$

Where Kq is the number of frames in the query sequence which could comprise the entire video sequence and Nt is the number of frames in the fingerprint only.

To extract a suitable feature-rich signature from the target sequence, the query sequence in Equations (24) to (26) above should be set to be a different encoded version of the target sequence. Equation (26) may be simplified to Equation (27) below, as the best match from each sequence should be aligned.

$$FGPM(m) = (fgpmatch(FGPSt(m), FGPSq(m))) \quad (27)$$

Equation (27) may be determined for all available starting points m in the target sequence to find the value mp that gives the maximum value FGPMpeak of FGPM(m) where m=mp as set out in Equation 28 below.

$$FGPMpeak = FGPM(mp) \quad (28)$$

The target signature that yields the highest match FGPMpeak is the one least affected by different encoding processes (at least as regards the different encoding processes used to find FGPMpeak and is considered to contain the strongest features for the difference measure being considered. This sequence may then be used alone or in combination with other high scoring target signatures to represent the target sequence in future signature tests—i.e. this is the value output by the fingerprint calculation module 26 when operating in the first mode of operation which is then stored in the fingerprint database 5 together with the identity of the known video from which the fingerprint has been determined.

Figure 16:
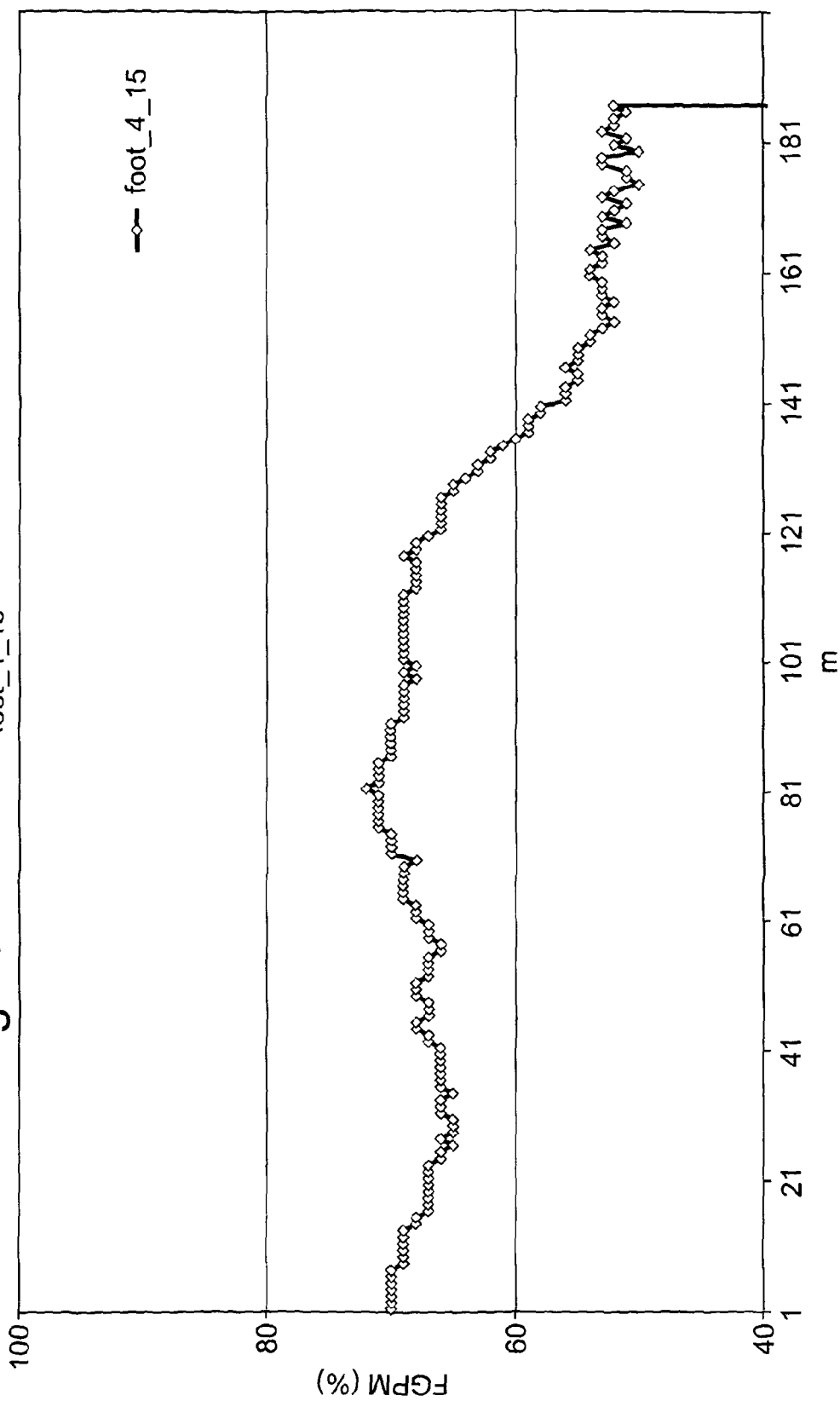
FIG. 16 is a graph showing the degree of match between a 25 frame fingerprint taken at different starting positions (i.e. starting frame number of the 25 frame sequence) from foot_4 and a corresponding fingerprint taken at the same starting frame number position from the sequence foot_1.5.

The 4 Mbit/s encoded sequence "Foot1_4" was used as a target sequence and a 1.5 Mbit/s encoded version "Foot1_15" of the same content was used as the query sequence for the signature analysis process described above with reference to Equations (24) to (28) above. A 25-frame fingerprint signature length and 10% activity threshold were applied for the 8 second sequences. The resulting values of FGPM calculated from (27) are shown in FIG. 16. The results show values of FGPM >68 for starting frames 64 to 119, but <56 for starting frames over 141. This indicates that the properties of the video from frame 141 onwards are less robust to the effects of encoding variation and are therefore least suited for use in building a signature.

Figure 17:
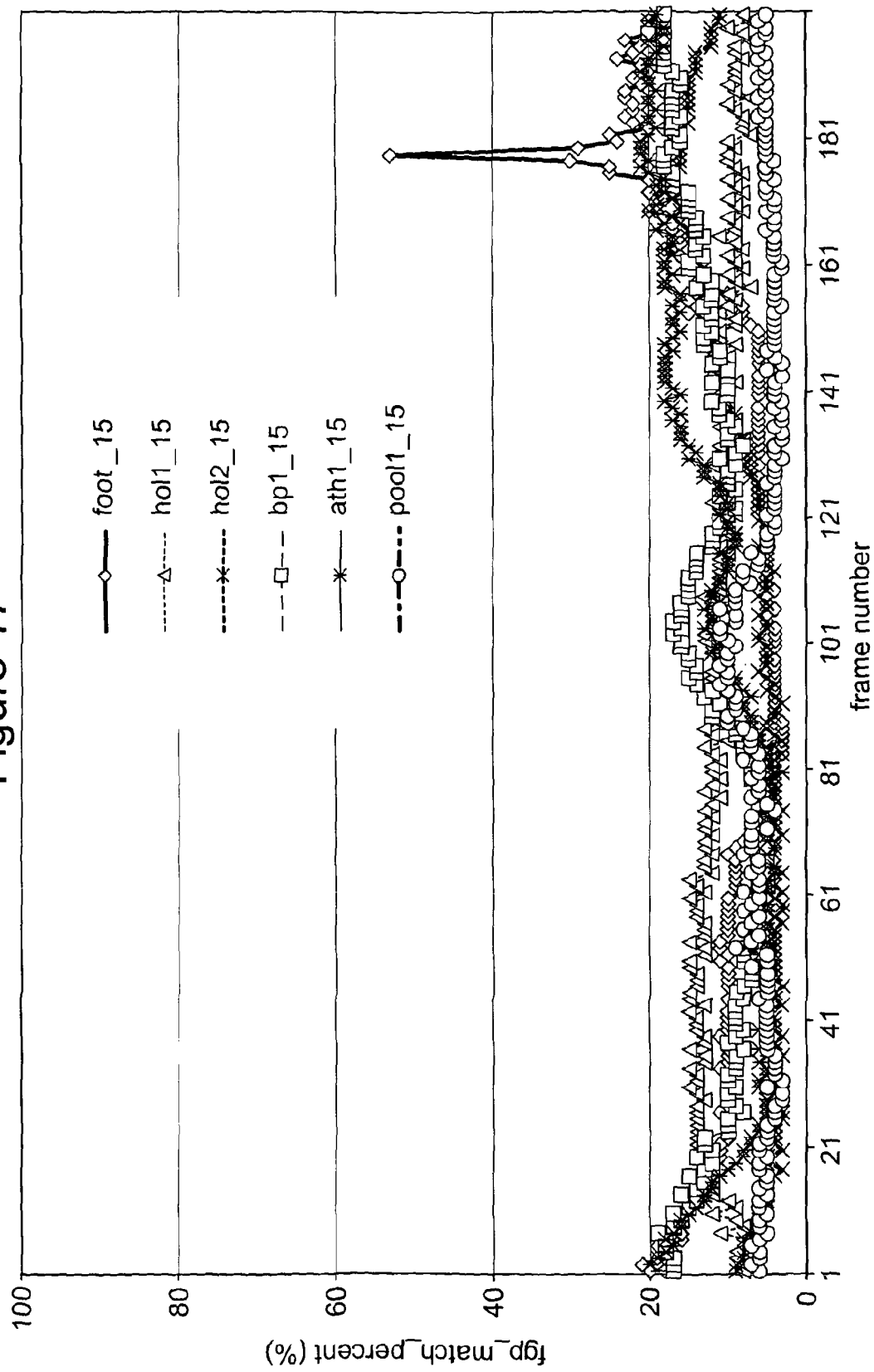
FIG. 17 is a graph showing the degree of match between a target fingerprint obtained from 25 frames of the video sequence "foot_4" starting at frame number 178 and a plurality of query video sequences (including the video sequence foot_1.5)
Figure 18:
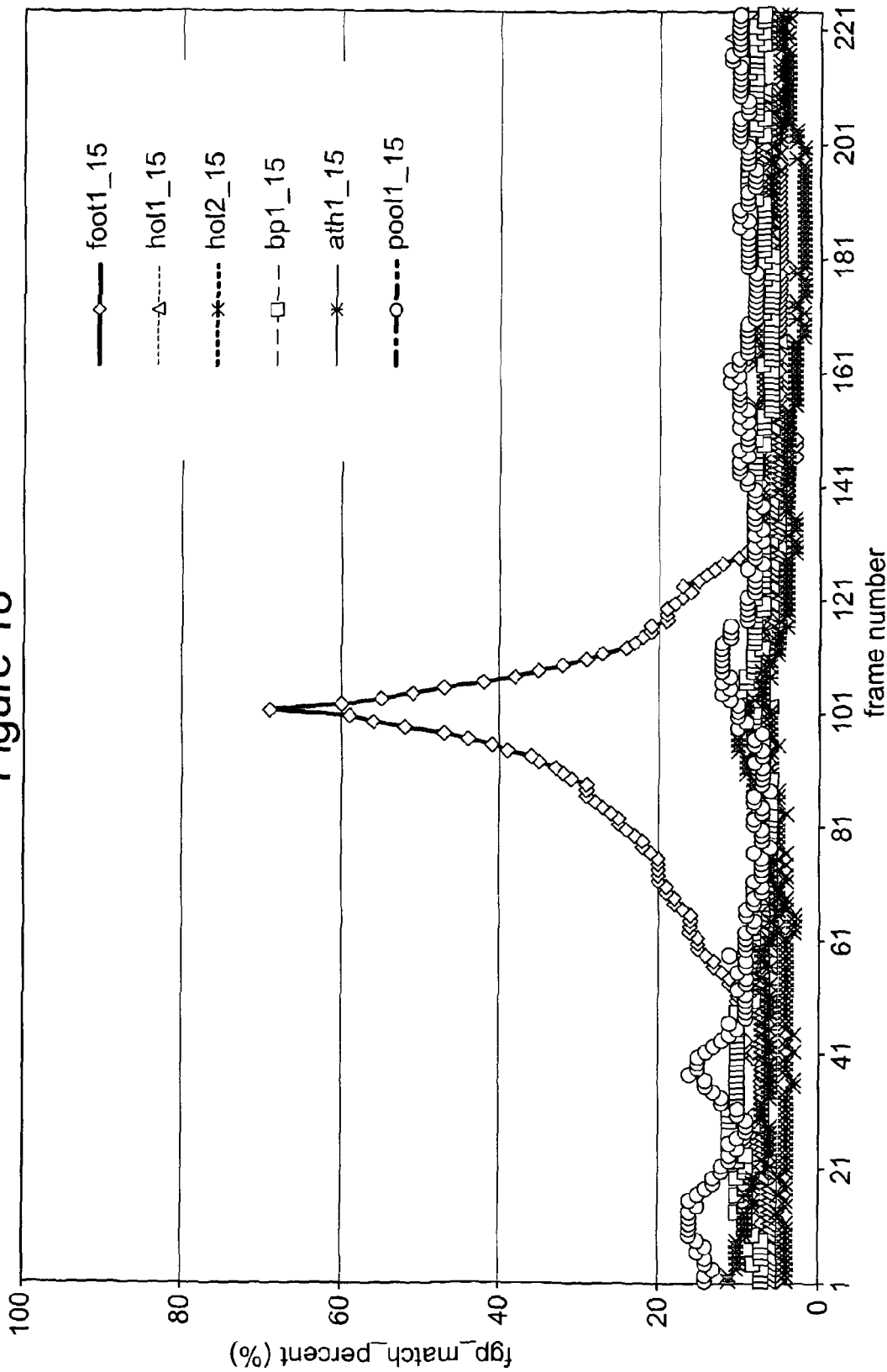
FIG. 18 is a graph similar to FIG. 17 showing the degree of match between a target fingerprint obtained from 25 frames of the video sequence "foot_4" but starting at frame number 101 and a plurality of query video sequences (including the video sequence foot_1.5).

The target signature for m=178 of "Foot1_4" gives a match value FGPM of 53% with "Foot1_15". The fingerprint matching procedure set out above with reference to Equations (22) and (23) was applied to compare this target signature with a sliding query window for "Foot1_15" and 5 different 1.5 Mbit/s 8 second sequences. The resulting values of fgpmatch calculated from (23) are shown in FIG. 17, with the expected peak value of 53% at frame 178 for "foot1_15" and the highest background value of 21% for sequence ath1_15 at frame 180. The target signature for m=101 of "Foot1_4" gives a match value FGPM of 69% with "Foot1_15". The fingerprint matching procedure for "Foot1_15" and the 5 different 1.5 Mbit/s 8 second sequences was repeated. The resulting values of fgpmatch calculated from (23) are shown in FIG. 18, with the expected peak value of 69% at frame 101 for "foot1_15" and the highest background value of 16% for sequence pool1_15 at frame 12. These results verify the value of the signature selection process described above with reference to Equations (24) to (28) to select robust and reliable signatures from a given test sequence.

Note on Interpretation of the Claims

It will be apparent to the skilled person having read this specification, that the gist of the approach used in this invention is to identify a set of macroblocks which are "difficult" to predict using normal processes for prediction (e.g. based on corresponding macroblocks in other frames within a video sequence). Generally this would be done in an automated process by generating a test value associated with the DCT coefficients associated with a residual macroblock and comparing this with some sort of threshold.

The Applicant has tried to word the claims very carefully so as to capture the basic gist of the invention in such a way that the claims are clearly distinguished from prior art systems where no such selection of difficult to predict macroblocks is made in order to generate a fingerprint of a piece of video content. However, it will be apparent that there may be other ways of so identifying difficult to predict macroblocks (e.g. which do not involve generating a test value based on DCT coefficients and comparing this test value with a threshold value) and the applicant intends that all such methods should be included in the broadest aspect of the present invention, although generating a test value based on DCT coefficients and comparing this test value with a threshold value remains a preferred approach given the efficiency with which it may be performed and its repeatability and general robustness as an approach etc.

The invention claimed is:

1. A method of generating a digital video fingerprint from a piece of digitally encoded video content, the video content having been encoded according to an encoding method which involves the generation of residual macroblocks of pixels and the generation of quantized transform coefficients of the residual macroblocks or of portions of the residual macroblocks, the method comprising: selecting a group of frames of the encoded video content; processing the digitally encoded video content to obtain a set of quantized transform coefficients of residual macroblocks or portions of residual macroblocks associated with each of the selected frames; identifying a set of residual macroblocks per frame whose transform coefficients satisfy a threshold criterion; and generating a digital video fingerprint for the encoded video content in dependence upon the identified macroblocks or some property thereof within each of the selected frames.

2. A method according to claim 1 wherein identifying a set of residual macroblocks per frame whose transform coefficients satisfy a threshold criterion includes generating a test value in respect of each macroblock, comparing the test value of each macroblock with a threshold value and identifying some of the macroblocks as having transform coefficients which do satisfy the threshold criterion and some of the macroblocks as having transform coefficients which do not satisfy the threshold criterion in dependence upon the comparison of the respective macroblocks' test values with the threshold value.

3. A method according to claim 2 wherein identifying a set of residual macroblocks per frame whose transform coefficients satisfy a threshold criterion is a multistage process which involves comparing a test value of a macroblock with different threshold values at different stages.

4. A method according to claim 1 wherein the step of selecting a group of frames of the encoded video content includes identifying a group of frames such that a digital video fingerprint generated therefrom has high levels of robustness and reliability.

5. A method according to claim 4 wherein the step of selecting a group of frames of the encoded video content comprises generating fingerprints from a plurality of different groups of frames of the encoded video and then ascertaining the degree of match found between each fingerprint derived from a respective one of this plurality of different groups of frames with a respective fingerprint generated from a corresponding group of frames taken from an encoding of the same video content using a different encoding method.

6. A process of identifying a digitally encoded and compressed piece of unknown video content, the process comprising: generating a database of fingerprints from a plurality of known pieces of video content using the method according to claim 1; generating a fingerprint from the unknown video content using the method and comparing the fingerprint generated from the unknown video content with each of the fingerprints in the database; and identifying the unknown piece of video content as being likely to be the known video content whose fingerprint within the database of fingerprints satisfies a similarity criterion when compared with the fingerprint generated from the unknown video content.

7. A digitally encoded video fingerprinting system comprising:
   a fingerprint database; and
   a video processing subsystem, the video processing subsystem being configured to at least execute:
      a fingerprint sequence selection to select one or more sets of frames to be processed in order to generate a fingerprint;
      a fingerprint calculation to generate a fingerprint based on a set of frames selected by the fingerprint sequence selection using the method according to claim 1; and
      a fingerprint comparison to compare two fingerprints and to output a similarity score of the compared fingerprints.

8. A digitally encoded video fingerprinting system according to claim 7 wherein the fingerprint comparison compares a fingerprint generated by the fingerprint calculation with a fingerprint extracted from the fingerprint database.

9. Apparatus for generating a digital video fingerprint from a piece of digitally encoded or partially decoded video content, the video content having been encoded according to an encoding method which involves the generation of residual macroblocks of pixels and the generation of quantized transform coefficients of the residual macroblocks or of portions of the residual macroblocks, the apparatus comprising:
   a processing system including a processor unit and a memory unit, the processing system being configured to at least execute:
      a fingerprint sequence selection to select a group of frames from the encoded or partially decoded video content; and
      a fingerprint calculation to identify a set of macroblocks per frame whose residual transform coefficients satisfy a threshold criterion and to generate a digital video fingerprint for the encoded or partially decoded video content in dependence upon the identified macroblocks or some property thereof within each of the selected frames.

10. Apparatus according to claim 9 further including a video decoder configured to generate partially decoded video content from digitally encoded video content, the partially decoded video content including residual transform coefficients.

11. The apparatus according to claim 9 further including a video decoding processor configured to generate partially decoded video content from digitally encoded video content, the partially decoded video content including residual transform coefficients.

12. A non-transitory computer-readable storage medium storing a computer program or suite of computer programs which upon execution by a computer system to provide functionality of generating a digital video fingerprint from a piece of digitally encoded video content, the video content having been encoded according to an encoding method which involves the generation of residual macroblocks of pixels and the generation of quantized transform coefficients of the residual macroblocks or of portions of the residual macroblocks, the functionality comprising:
   selecting a group of frames of the encoded video content;
   processing the digitally encoded video content to obtain a set of quantized transform coefficients of residual macroblocks or portions of residual macroblocks associated with each of the selected frames;
   identifying a set of residual macroblocks per frame whose transform coefficients satisfy a threshold criterion; and
   generating a digital video fingerprint for the encoded video content in dependence upon the identified macroblocks or some property thereof within each of the selected frames.

13. The non-transitory computer-readable storage medium of claim 12, wherein identifying a set of residual macroblocks per frame whose transform coefficients satisfy a threshold criterion includes generating a test value in respect of each macroblock, comparing the test value of each macroblock with a threshold value and identifying some of the macroblocks as having transform coefficients which do satisfy the threshold criterion and some of the macroblocks as having transform coefficients which do not satisfy the threshold criterion in dependence upon the comparison of the respective macroblocks' test values with the threshold value.

14. The non-transitory computer-readable storage medium of claim 13, wherein identifying a set of residual macroblocks per frame whose transform coefficients satisfy a threshold criterion is a multistage process which involves comparing a test value of a macroblock with different threshold values at different stages.

15. The non-transitory computer-readable storage medium of claim 12, wherein selecting a group of frames of the encoded video content includes identifying a group of frames such that a digital video fingerprint generated therefrom has high levels of robustness and reliability.

16. The non-transitory computer-readable storage medium of claim 15, wherein selecting a group of frames of the encoded video content comprises generating fingerprints from a plurality of different groups of frames of the encoded video and then ascertaining the degree of match found between each fingerprint derived from a respective one of this plurality of different groups of frames with a respective fingerprint generated from a corresponding group of frames taken from an encoding of the same video content using a different encoding method.

17. A non-transitory computer-readable storage medium storing a computer program or suite of computer programs which upon execution by a computer system performs a process of identifying a digitally encoded and compressed piece of unknown video content, the process comprising:
generating a database of fingerprints from a plurality of known pieces of video content using a method of generating a digital video fingerprint from a piece of digitally encoded video content, the video content having been encoded according to an encoding process which involves a generation of residual macroblocks of pixels and a generation of quantized transform coefficients of the residual macroblocks or of portions of the residual macroblocks, the method comprising:
selecting a group of frames of the encoded video content;
processing the digitally encoded video content to obtain a set of quantized transform coefficients of residual macroblocks or portions of residual macroblocks associated with each of the selected frames;
identifying a set of residual macroblocks per frame whose transform coefficients satisfy a threshold criterion; and
generating a digital video fingerprint for the encoded video content in dependence upon the identified macroblocks or some property thereof within each of the selected frames;
generating a fingerprint from the unknown video content using the method and comparing the fingerprint generated from the unknown video content with each of the fingerprints in the database; and
identifying the unknown piece of video content as being likely to be the known video content whose fingerprint within the database of fingerprints satisfies a similarity criterion when compared with the fingerprint generated from the unknown video content.

18. A method of generating a digital video fingerprint from a piece of digitally encoded video content, the video content having been encoded according to an encoding method which involves the generation of residual macroblocks of pixels and the generation of quantized transform coefficients of the residual macroblocks or of portions of the residual macroblocks, the method comprising:
selecting a group of frames of the encoded video content;
processing the digitally encoded video content to obtain a set of quantized transform coefficients of residual macroblocks or portions of residual macroblocks associated with each of the selected frames;
identifying a set of residual macroblocks per frame whose sum of transform coefficients satisfy a threshold criterion; and
generating a digital video fingerprint for the encoded video content in dependence upon the identified macroblocks or some property thereof within each of the selected frames.

19. Apparatus for generating a digital video fingerprint from a piece of digitally encoded or partially decoded video content, the video content having been encoded according to an encoding method which involves the generation of residual macroblocks of pixels and the generation of quantized transform coefficients of the residual macroblocks or of portions of the residual macroblocks, the apparatus comprising:
a processing system including a processor unit and a memory unit, the processing system being configured to at least execute:
a fingerprint sequence selection to select a group of frames from the encoded or partially decoded video content; and
a fingerprint calculation to identify a set of macroblocks per frame whose sum of residual transform coefficients satisfy a threshold criterion and to generate a digital video fingerprint for the encoded or partially decoded video content in dependence upon the identified macroblocks or some property thereof within each of the selected frames.

* * * * *